United States Patent
Sorgenti

(10) Patent No.: US 10,718,375 B2
(45) Date of Patent: Jul. 21, 2020

(54) BEARING SYSTEM WITH SELF-LUBRICATION FEATURES, SEALS, GROOVES AND SLOTS FOR MAINTENANCE-FREE OPERATION

(71) Applicant: Roller Bearing Company of America, Inc., Oxford, CT (US)

(72) Inventor: Stephen Sorgenti, Trumbull, CT (US)

(73) Assignee: Roller Bearing Company of America, Inc., Oxford, CT (US)

(*) Notice: Subject to any disclaimer, the term of this patent is extended or adjusted under 35 U.S.C. 154(b) by 165 days.

(21) Appl. No.: 15/594,881

(22) Filed: May 15, 2017

(65) Prior Publication Data

US 2017/0328402 A1 Nov. 16, 2017

Related U.S. Application Data

(60) Provisional application No. 62/336,811, filed on May 16, 2016.

(51) Int. Cl.
*F16C 17/26* (2006.01)
*F16C 11/04* (2006.01)
(Continued)

(52) U.S. Cl.
CPC .............. *F16C 17/26* (2013.01); *B60D 1/14* (2013.01); *B60D 1/586* (2013.01); *F16C 11/045* (2013.01);
(Continued)

(58) Field of Classification Search
CPC ...... F16C 17/26; F16C 11/0445; F16C 17/02; F16C 17/04; F16C 33/104; F16C 33/1095; F16C 33/20; B60D 1/14; B60D 1/586
(Continued)

(56) References Cited

U.S. PATENT DOCUMENTS 2,626,839 A * 1/1953 Creson .................... F16C 33/74
277/572
2,702,730 A * 2/1955 Ivanoff .................... F16C 33/20
29/898.055
(Continued)

FOREIGN PATENT DOCUMENTS

CN 202017219 U 10/2011
DE 1044532 B 11/1958
(Continued)

OTHER PUBLICATIONS

Partial European Search Report for corresponding EP17171217 dated Oct. 20, 2017.
European Search Report from EP 19210097.2, dated Jan. 24, 2020.

*Primary Examiner* — Jacob D Knutson
(74) *Attorney, Agent, or Firm* — Murtha Cullina LLP

(57) ABSTRACT

A maintenance-free bearing system having self-lubricating features, seals, grooves and slots for use in a cushion hitch assembly for a hitch pull scraper vehicle. An interconnected bearing linkage system having two or more horizontal two-axis combined journal and thrust bearings with self-lubricating liners therein, two or more vertical single-axis sleeve bearings with self-lubricating liners therein and one or more vertical thrust bearing with self-lubricating liners therein, that cooperate with one another to accommodate vertical and horizontal angular movement relative to one another.

21 Claims, 26 Drawing Sheets

(51) Int. Cl.
*F16C 33/10* (2006.01)
*F16C 33/20* (2006.01)
*B60D 1/14* (2006.01)
*B60D 1/58* (2006.01)
*F16C 17/02* (2006.01)
*F16C 17/04* (2006.01)

(52) U.S. Cl.
CPC ............. *F16C 17/02* (2013.01); *F16C 17/04* (2013.01); *F16C 33/104* (2013.01); *F16C 33/1095* (2013.01); *F16C 33/20* (2013.01); *F16C 2208/04* (2013.01); *F16C 2208/20* (2013.01); *F16C 2208/32* (2013.01); *F16C 2208/40* (2013.01); *F16C 2208/90* (2013.01); *F16C 2326/00* (2013.01); *F16C 2326/01* (2013.01); *F16C 2326/20* (2013.01)

(58) Field of Classification Search
USPC ....................................................... 280/492
See application file for complete search history.

(56) References Cited

U.S. PATENT DOCUMENTS

| | | | |
|---|---|---|---|
| 3,445,121 A * | 5/1969 | Lineker | F16J 15/3232 277/356 |
| 3,843,216 A * | 10/1974 | Campbell | F16C 33/20 384/152 |
| 3,942,336 A * | 3/1976 | Schultenkamper | F16D 3/06 464/162 |
| 4,003,562 A * | 1/1977 | Kaiser | B60G 11/12 267/268 |
| 4,147,367 A * | 4/1979 | Smith | F16J 15/3224 277/505 |
| 4,219,205 A * | 8/1980 | Christiansen | F16J 15/3232 277/565 |
| 4,834,397 A * | 5/1989 | Shimasaki | F16J 15/3204 277/564 |
| 5,026,324 A * | 6/1991 | Schurger | F16C 33/7809 277/551 |
| 5,137,374 A | 8/1992 | Orkin | |
| 5,143,457 A * | 9/1992 | Langhof | F16C 27/063 384/215 |
| 5,263,736 A | 11/1993 | Stevens | |
| 5,827,042 A * | 10/1998 | Ramsay | F04D 3/02 415/112 |
| 6,517,082 B2 | 2/2003 | Yamada et al. | |
| 6,517,083 B2 | 2/2003 | Yamada et al. | |
| 6,616,118 B2 | 9/2003 | Nortier | |
| 6,726,219 B2 | 4/2004 | Bivens | |
| 6,866,271 B2 | 3/2005 | MacDonald | |
| 7,004,471 B2 | 2/2006 | Bryde et al. | |
| 7,036,613 B2 | 5/2006 | Burr | |
| 7,134,671 B2 | 11/2006 | Duke et al. | |
| 7,291,006 B2 | 11/2007 | Ilmonen | |
| 7,469,906 B2 | 12/2008 | Peet et al. | |
| 7,788,778 B2 | 9/2010 | Relan | |
| 7,850,765 B2 | 12/2010 | Kleinschmidt | |
| 7,901,140 B2 * | 3/2011 | Petri | F16C 11/04 384/130 |
| 7,942,422 B2 | 5/2011 | Tierling | |
| 8,099,012 B2 | 1/2012 | Askren et al. | |
| 8,235,255 B2 | 8/2012 | Springhorn et al. | |
| 8,272,556 B2 | 9/2012 | Marion | |
| 8,516,671 B2 | 8/2013 | Scheidenhelm | |
| 8,529,545 B2 | 9/2013 | Connolly et al. | |
| 8,544,816 B2 | 10/2013 | Bielass | |
| 8,590,304 B2 | 11/2013 | Bernadat et al. | |
| 8,590,903 B2 | 11/2013 | Berdichevsky et al. | |
| 8,764,034 B2 | 7/2014 | Wells et al. | |
| 8,833,338 B2 | 9/2014 | Pekrul | |
| 8,914,959 B2 | 12/2014 | Relan | |
| 8,919,782 B2 | 12/2014 | Berdichevsky | |
| 8,920,900 B2 | 12/2014 | Nakayama | |
| 9,581,199 B2 * | 2/2017 | Tanaka | F16C 33/74 |
| 9,599,227 B2 | 3/2017 | Himeno et al. | |
| 9,611,712 B2 | 4/2017 | Kalinec | |
| 9,624,645 B2 | 4/2017 | Choi et al. | |
| 9,775,460 B2 | 10/2017 | Summons | |
| 9,879,727 B2 | 1/2018 | Makke et al. | |
| 9,915,359 B2 | 3/2018 | Ricard et al. | |
| 10,139,003 B2 | 11/2018 | Yamanaka et al. | |
| 10,184,583 B2 | 1/2019 | Walkowski | |
| 10,221,954 B2 | 3/2019 | Fong | |
| 10,286,889 B2 | 5/2019 | Kim | |
| 2004/0056427 A1 | 3/2004 | Rapp et al. | |
| 2004/0113369 A1 | 6/2004 | Wright et al. | |
| 2004/0223930 A1 | 11/2004 | Cho | |
| 2004/0245728 A1 | 12/2004 | Armour et al. | |
| 2004/0256475 A1 | 12/2004 | Henige | |
| 2005/0167219 A1 | 8/2005 | Hall et al. | |
| 2006/0147141 A1 | 7/2006 | Harwood et al. | |
| 2006/0175762 A1 | 8/2006 | Barnett et al. | |
| 2007/0039654 A1 | 2/2007 | Pinette | |
| 2008/0014300 A1 | 1/2008 | Ilmonen | |
| 2008/0053060 A1 | 3/2008 | Olver | |
| 2008/0169157 A1 | 7/2008 | Wyker et al. | |
| 2008/0251345 A1 | 10/2008 | Zahner et al. | |
| 2008/0315534 A1 | 12/2008 | Guiochet et al. | |
| 2009/0085328 A1 | 4/2009 | Moyna | |
| 2009/0238506 A1 * | 9/2009 | Inoue | F01D 25/16 384/291 |
| 2009/0274566 A1 | 11/2009 | Fong | |
| 2009/0302548 A1 | 12/2009 | Ramsay | |
| 2010/0278642 A1 | 11/2010 | Olver | |
| 2011/0085757 A1 | 4/2011 | White et al. | |
| 2011/0091143 A1 | 4/2011 | Murphy et al. | |
| 2011/0220762 A1 | 9/2011 | Gyuricsko et al. | |
| 2012/0058923 A1 | 3/2012 | Hamel et al. | |
| 2012/0241648 A1 | 9/2012 | Krampert | |
| 2012/0313329 A1 | 12/2012 | Battles | |
| 2014/0021687 A1 | 1/2014 | Berdichevsky et al. | |
| 2014/0093198 A1 | 4/2014 | Voisine | |
| 2014/0203520 A1 | 7/2014 | Yamanaka et al. | |
| 2014/0284883 A1 | 9/2014 | Kustermans et al. | |
| 2015/0031958 A1 | 1/2015 | Kleyman | |
| 2015/0233417 A1 * | 8/2015 | Komatsubara | F16C 17/107 384/113 |
| 2015/0354703 A1 | 12/2015 | Berdichevsky et al. | |
| 2016/0068204 A1 | 3/2016 | Rathod | |
| 2017/0122055 A1 | 5/2017 | Embury | |
| 2018/0355977 A1 | 12/2018 | Tanner et al. | |
| 2019/0226584 A1 | 7/2019 | Cabaj et al. | |
| 2019/0301612 A1 | 10/2019 | Maina et al. | |

FOREIGN PATENT DOCUMENTS

| | | |
|---|---|---|
| DE | 3873149 T2 | 3/1993 |
| EP | 1659303 A1 | 5/2006 |
| EP | 2505858 A2 | 3/2012 |
| FR | 2908728 A1 | 5/2008 |
| GB | 1482138 A | 8/1977 |
| JP | 2005069365 A | 3/2005 |

* cited by examiner

BEARING SYSTEM WITH SELF-LUBRICATION FEATURES, SEALS, GROOVES AND SLOTS FOR MAINTENANCE-FREE OPERATION

CROSS REFERENCE TO RELATED APPLICATIONS

The instant application is a non-provisional application and claims priority to U.S. Provisional Patent Application No. 62/336,811, filed on May 16, 2016 and entitled "Bearing System with Self-Lubrication Features, Seals, Grooves and Slots for Maintenance-Free Operation", the entirety of which is incorporated herein by reference.

FIELD OF THE INVENTION

This invention relates to a maintenance-free bearing system having self-lubricating features, seals, grooves and slots for use in a cushion hitch assembly for a hitch pull scraper vehicle, and is more particularly related to an interconnected bearing linkage system having two or more horizontal two-axis combined journal and thrust bearings with self-lubricating liners therein, two or more vertical single-axis sleeve bearings with self-lubricating liners therein and one or more vertical thrust bearing with self-lubricating liners therein, that cooperate with one another to accommodate vertical and horizontal angular movement relative to one another.

BACKGROUND

As shown in FIG. 1 a hitch pull type scraper 100 includes a pulling portion 101 such as a diesel engine powered cab or cabin. A scraper bowl 102 is coupled to the pulling portion (e.g., a cab or cabin) 101 by a hitch assembly 103. The hitch assembly 103 includes two H-links each having two journal bearings therein having a common shaft and another two journal bearings having another common shaft. The H-links moveably couple a linkage structure to a portion of the pulling portion 101. The hitch assembly 103 includes two vertical journal bearings disposed in a housing. Above one of the journal bearings is a thrust bearing. The two vertical journal bearings each employ a bronze sleeve disposed between a shaft and an interior surface defined by a bore in housing to facilitate rotational movement between the shaft and the housing. The thrust bearing employs a bronze bearing plate disposed therein to accommodate rotational movement of an upper thrust plate relative to a lower thrust plate.

A grease supply system (e.g., a configuration of tubes, valves and pressurizing devices) injects grease between the upper thrust plate and the lower thrust plate and the bronze bearing plate to maintain lubrication therebetween. The grease supply system also supplies grease to the sleeve in the journal bearings. The grease supply system can be damaged by projectiles such as rocks and stones that are propelled by the movement of the scraper 100. Use of a grease supply system leads to several undesired effects such as: 1) increased power requirements for the vehicle; 2) increased capital cost and maintenance related costs; and 3) environmental impact when old grease is purged from bearings, for example grease can seep out of the bearings during re-lubrication or due to leakage and can fall onto the ground. In addition, damage of the grease supply system can cause the flow of grease to the thrust bearing and journal bearings to cease and create undesirable grease discharge to the environment.

Thus, there is a need for an improved bearing system for the hitch assembly in a scraper vehicle.

DETAILED DESCRIPTION OF THE INVENTION

Figure 1:
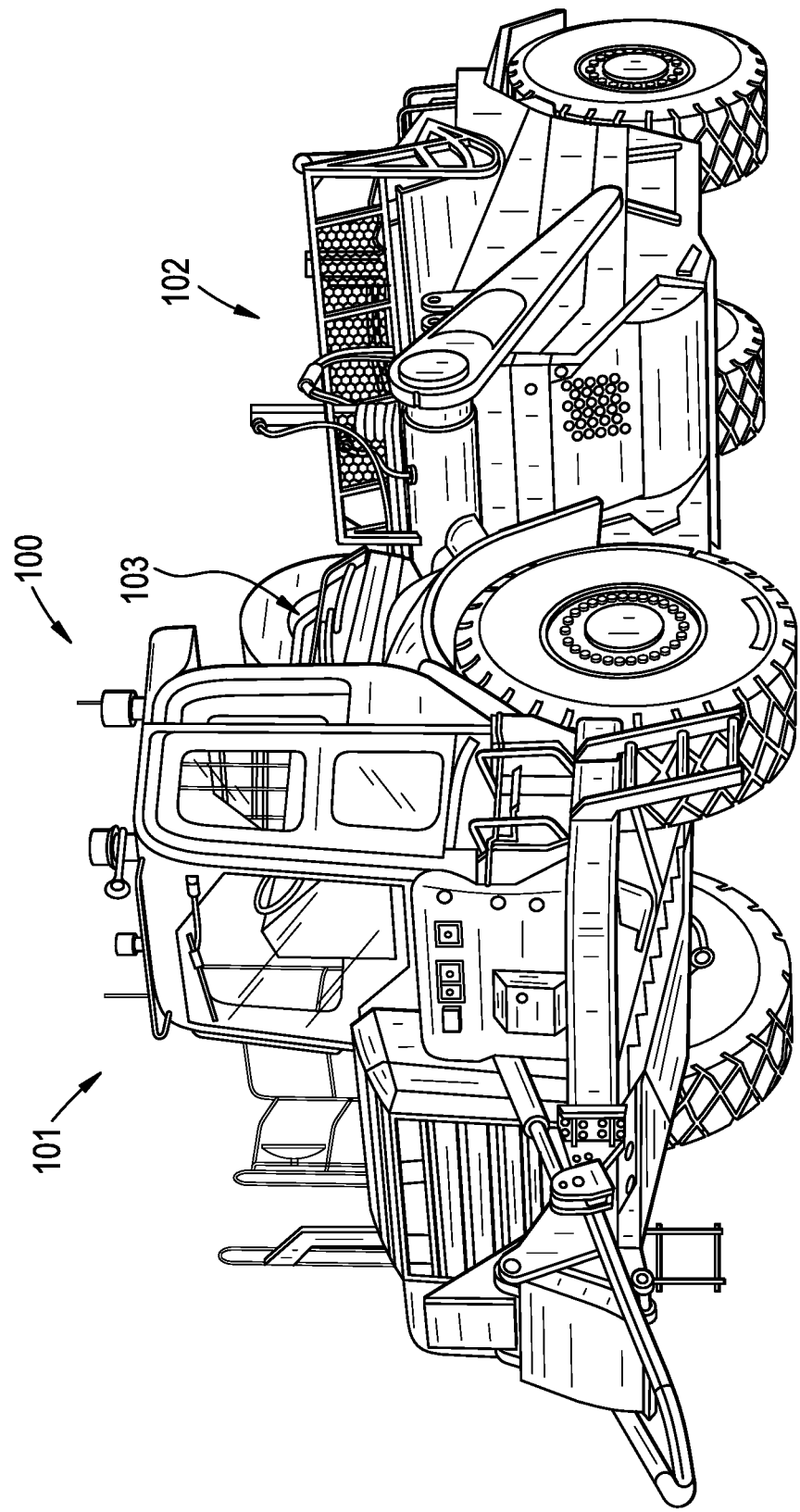
FIG. 1 is a perspective view of a hitch pull scraper vehicle.
Figure 2:
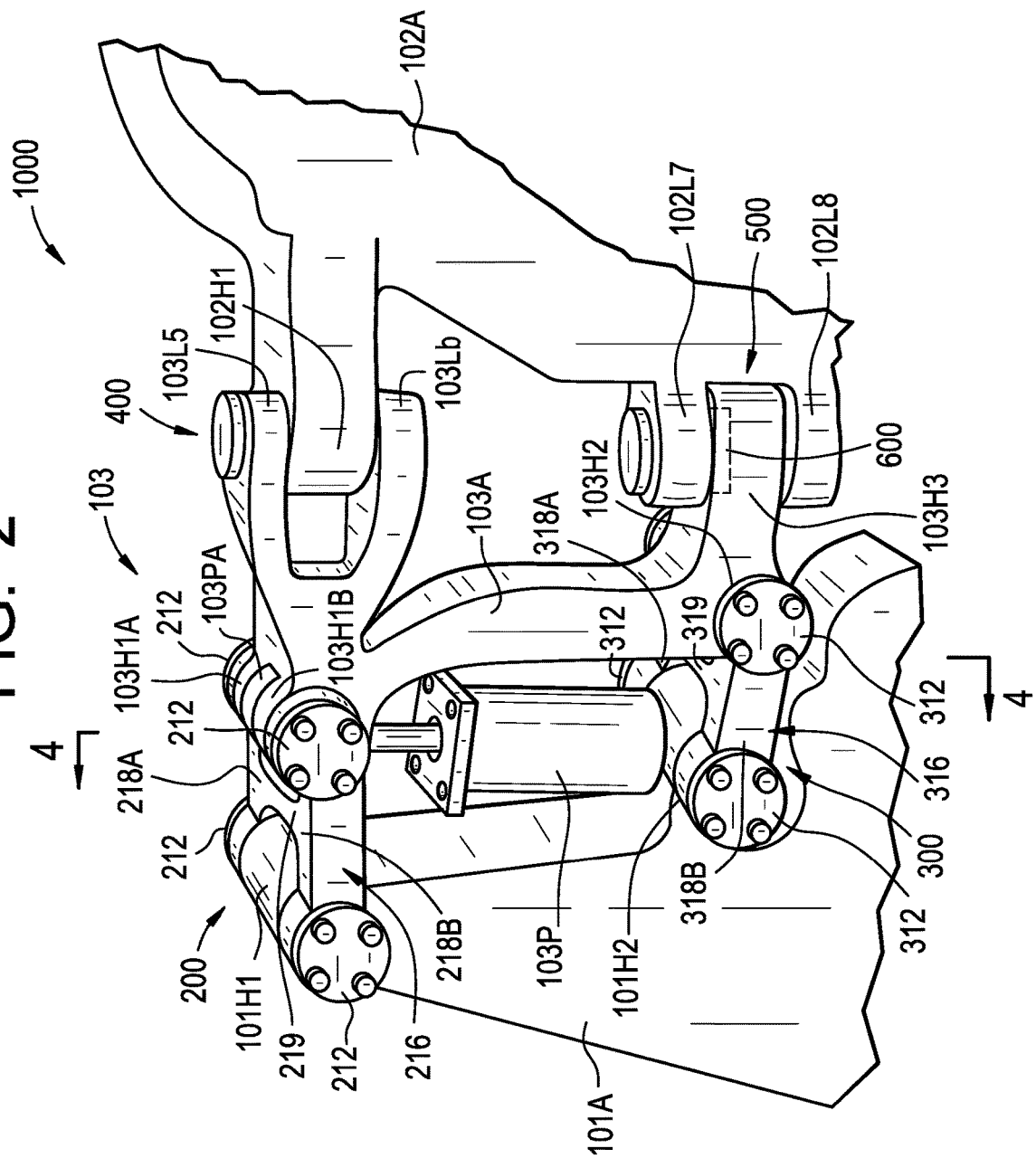
FIG. 2 is an enlarged view of the hitch area of a hitch pull scraper as shown in FIG. 1.

Referring to FIG. 2, a bearing system for a hitch assembly for a heavy load capacity vehicle (e.g., a scraper bowl 102 hitched (via the hitch assembly 103) to and pulled by a diesel engine power cabin or cab 100, as shown in FIG. 1) is generally designated by the number 1000. The bearing system 1000 includes a linkage structure having three links, for example: 1) a cabin support link 101A (e.g., a support structure) extending from the cabin 101; 2) a bowl support link 102A (e.g., a support structure); and 3) a connector link 103A (e.g., a support structure) that moveably couples the cabin support link 101A to the bowl support link 102A to allow rotational movement in two or more axes of rotation (e.g., horizontal and vertical). In one embodiment, a piston cylinder assembly 103P is coupled to the cabin support link 101A and the connector link 103A.

As shown in FIG. 2 the bearing system includes: 1) a first journal bearing assembly 200 that is moveably secured to the cabin support link 101A and the connector link 103A; 2) a second journal bearing assembly 300 is moveably secured to the cabin support link 101A and the connector link 103A; 3) a third journal bearing assembly 400 moveably secured to the connector link 103A and the bowl support link 102A; 4) a fourth journal bearing assembly 500 moveably secured to the connector link 103A and the bowl support link 102A; and 5) a thrust bearing assembly 600 disposed above the fourth journal bearing assembly 500 and between the connector link 103A and the bowl support link 102A. In one embodiment, one or more seals, as described herein, are disposed in one or more of the first journal bearing assembly 200, the second journal bearing assembly 300, the third journal bearing assembly 400, the fourth journal bearing assembly 500 and the thrust bearing assembly 600.

Figure 3:
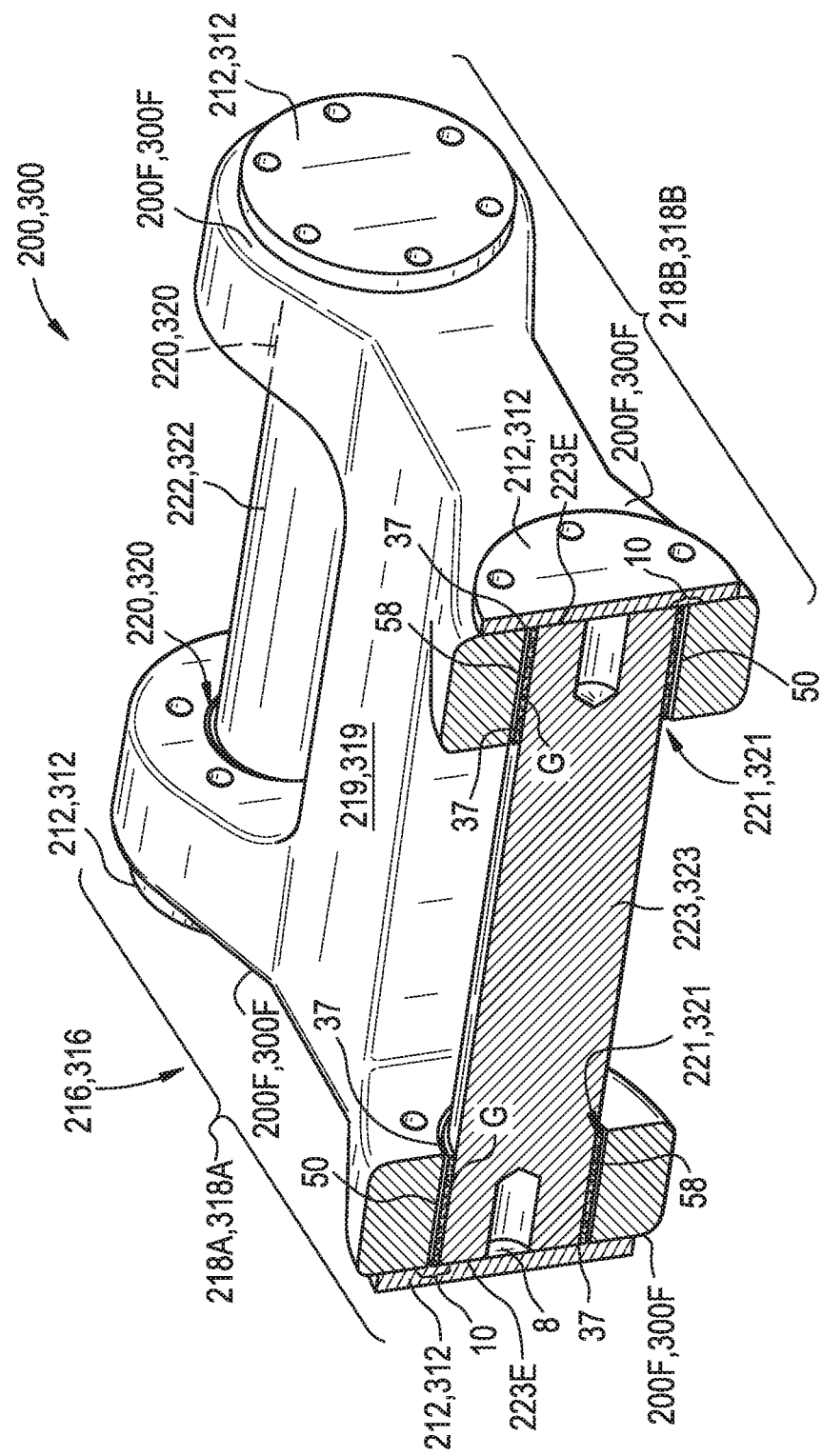
FIG. 3 is a perspective and partial cross sectional view of one of the H-links of FIG. 2, taken across line 4-4 and having a bearing with a self-lubricating sleeve, of the present invention disposed therein.

As shown in FIG. 2 the first journal bearing assembly is generally designated by the number 200. The first journal bearing assembly 200 (e.g., an H-link assembly as shown in FIG. 3) includes four self-lubricating sleeve assemblies 10 (see FIG. 5) disposed therein and an end cap (212, 12 in FIG. 6) positioned on an axial end of each of four positions on the first journal bearing assembly 200. The thrust bearing end caps 212 each have a self-lubricating pad 8 (See FIG. 6) disposed on an axially inward facing surface thereof. While the thrust bearing end caps are shown and described herein, the present invention is not limited in this regard, as other configurations may apply, including, but not limited to, those with integrally sealed or welded ends, or with no end caps or partial end caps.

As shown in FIGS. 3, 4, 5, 7, 8, 10. 11, 13, 15, 17, 20, 22, 23 and 25, each of the self-lubricating sleeve assemblies 10 includes an outer sleeve 50 with a self-lubricating sleeve 58 secured (e.g., via an adhesive such as epoxy or phenolic resin) to an interior surface of the outer sleeve 50, as described further herein.

As shown in FIG. 2 the second journal bearing assembly is generally designated by the number 300. The second journal bearing assembly 300 (e.g., an H-link assembly as shown in FIG. 3) includes four of the self-lubricating sleeve assemblies 10 (see FIG. 5) disposed therein and one of the end caps (312, 12 in FIG. 6) positioned on an axial end of each of four positions on the second journal bearing assembly 300. The end caps 312 each have one of the self-lubricating pads 8 (see FIG. 6) disposed on the axially inward facing surface thereof.

The third journal bearing assembly 400 includes one of the self-lubricating sleeve assemblies 10 (see FIG. 5) disposed therein.

The fourth journal bearing assembly 500 includes one of the self-lubricating sleeve assemblies 10 (see FIG. 5) disposed therein. The thrust bearing assembly 600 is disposed around the fourth journal bearing assembly 500 and includes a self-lubricating cartridge 14 (see FIG. 10) disposed on at least one axially facing surface thereof.

As shown in FIG. 3, the first journal bearing assembly 200 is mounted in a first housing 216 (e.g., a body portion of the H-link). The first housing 216 includes a first leg 218A and a second leg 218B spaced apart from and centrally coupled to one another by a joint 219.

As shown in FIG. 3, a first bore 220 extends through the first leg 218A and the second leg 218B. One of the self-lubricating sleeve assemblies 10 (see FIG. 5) is secured in the first bore 220 of each of the first leg 218A and the second leg 218B. A first shaft 222 extends into and rotatingly engages a radially inward facing surface of each of the self-lubricating sleeves 58 in the first bore 220 of each of the first leg 218A and the second leg 218B. The first shaft 222 is configured to receive a first hub 101H1 (as shown in FIG. 2) therearound and between the first leg 218A and the second leg 218B. The first hub 101H1 extends from the cabin support link 101A. A thrust bearing end cap 212 is removably secured (e.g., via bolting) to an axially outward facing surface 200F of each the first housing 216 outside of the first bore 220 of the each of the first leg 218A and the second leg 218B. As shown in FIG. 6, each of the end caps 212 includes a self-lubricating pad 8 secured thereto for sliding engagement with a respective axial end of the first shaft 222. The self-lubricating pad 8 is centrally located between a circular pattern of bolt holes 8H, as shown in FIG. 6.

Figure 4:
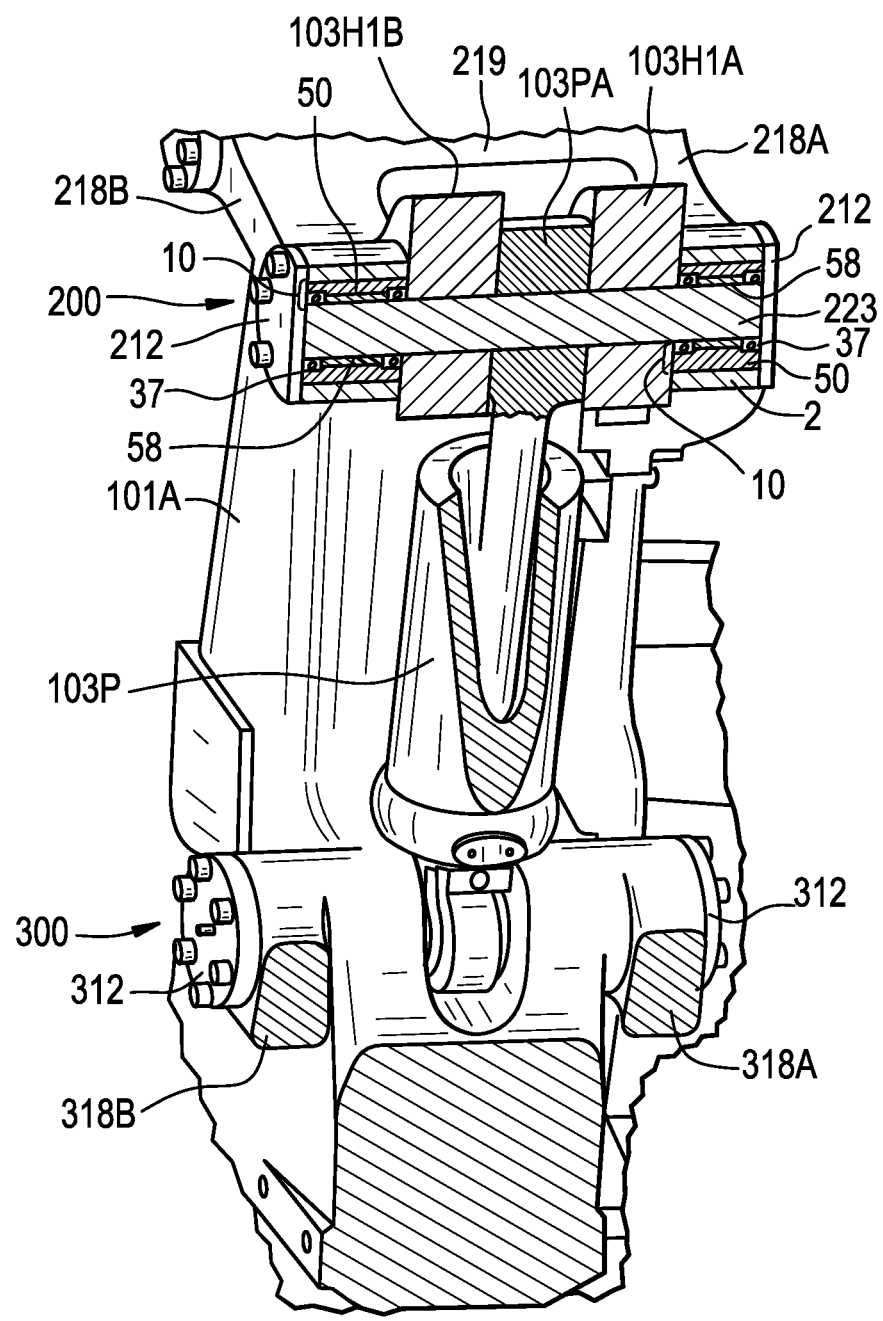
FIG. 4 is a cross sectional view of a portion of the hitch of FIG. 2 taken across line 4-4.

As shown in FIG. 3, a second bore 221 extends through the first leg 212A and the second leg 212B. One of the self-lubricating sleeve assemblies 10 (see FIG. 5) is secured in the second bore 221 of each of the first leg 218A and the second leg 218B. A second shaft 223 extends into and rotatingly engages an axially inward facing surface of each of the self-lubricating pads 8 in the first bore 220 of each of the first leg 218A and the second leg 218B. The second shaft 223 is configured to receive a pair of second hubs 103H1A and 103H1B therearound (as shown in FIG. 2) and between the first leg 218A and the second leg 218B. The pair of second hubs 103H1A and 103H1B extend from the connector link 103A. A thrust bearing end cap 212 is removably secured (e.g., via bolting) to an axially outward facing surface 200F of each the first housing 216 outside of the second bore 221 of the each of the first leg 218A and the second leg 218B. As shown in FIG. 6, each of the end caps 212 includes a self-lubricating pad 8 secured thereto for sliding engagement with a respective axial end 223E of the first shaft 223, as shown in FIG. 3. The self-lubricating pad 8 is centrally located between a circular pattern of bolt holes 8H. In one embodiment, a piston hub 103PA extends from the piston cylinder assembly 103P and has a bore therein in which the shaft 223 extends. The piston hub 103PA is positioned between the pair of second hubs 103H1A and 103H1B, as shown in FIG. 4.

As shown in FIG. 3, the second journal bearing assembly 300 is mounted in a second housing 316 (e.g., a body portion of the H-link). The second housing 316 includes a first leg 318A and a second leg 318B spaced apart from and centrally coupled to one another by a joint 319.

As shown in FIG. 3, a third bore 320 extends through the first leg 318A and the second leg 318B. One of the self-lubricating sleeves 10 (see FIG. 5) is secured in the third bore 320 of each of the first leg 318A and the second leg 318B. A third shaft 322 extends into and rotatingly engages a radially inward facing surface of each of the self-lubricating sleeves 58 in the third bore 320 of each of the first leg 318A and the second leg 318B. The third shaft 322 is configured to receive a third hub 101H2 therearound and between the first leg 318A and the second leg 318B. The third hub 101H2 extends from the cabin support link 101A. A thrust bearing end cap 312 is removably secured (e.g., via bolting) to an axially outward facing surface 300F of the second housing 316 outside of the third bore 320 of the each of the first leg 318A and the second leg 318B. As shown in FIG. 6, each of the end caps 312 includes a self-lubricating pad 8 secured thereto for sliding engagement with a respective axial end 322E of the third shaft 322. The self-lubricating pad 8 is centrally located between a circular pattern of bolt holes 8H.

As shown in FIG. 3, a second bore 321 extends through the first leg 318A and the second leg 318B. One of the self-lubricating sleeves 10 (see FIG. 5) is secured in the second bore 321 of each of the first leg 318A and the second leg 318B. A fourth shaft 323 extends into and rotatingly engages a radially inward facing surface of each of the self-lubricating sleeves 58 in the first bore 320 of each of the first leg 318A and the second leg 318B. The fourth shaft 323 is configured to receive a fourth hub 103H2 therearound and between the first leg 318A and the second leg 318B. The fourth hub 103H2 extends from the connector link 103A. A thrust bearing end cap 312 is removably secured (e.g., via bolting) to an axially outward facing surface 300F of each the second housing 316 outside of the fourth bore 321 of the each of the first leg 318A and the second leg 318B. As shown in FIG. 6, each of the end caps 312 includes a self-lubricating pad 8 secured thereto for sliding engagement with a respective axial end 322E of the fourth shaft 323. The self-lubricating pad 8 is centrally located between a circular pattern of bolt holes 8H.

Figure 7:
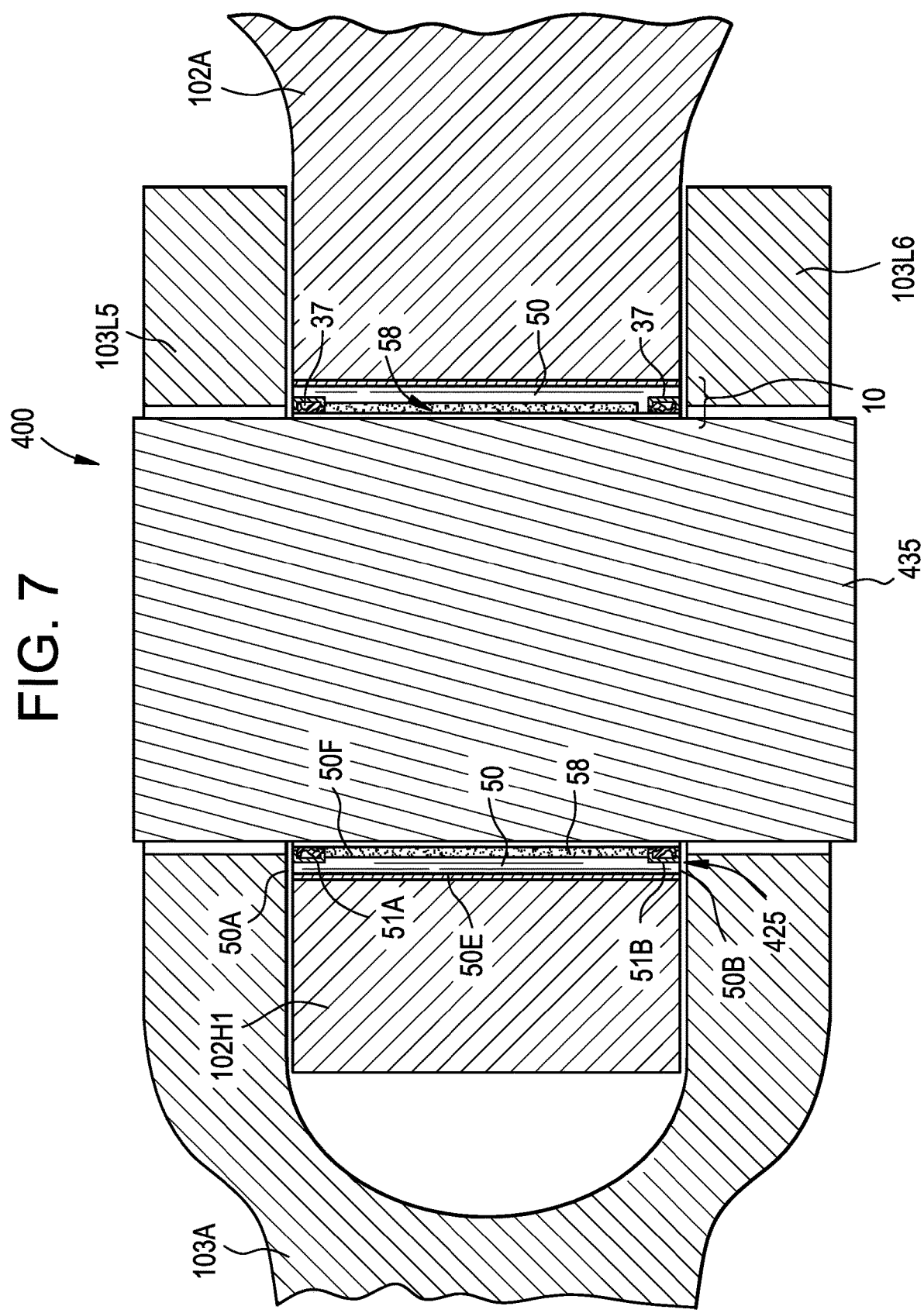
FIG. 7. is a cross sectional view of the journal bearing assembly of FIG. 2 shown with the journal bearing of FIG. 5 therein.

As shown in FIG. 3, a third journal bearing assembly 400 (e.g., a vertical journal bearing assembly) is mounted in a third housing 102H1. The third housing 102H1 extends from the bowl support link 102A and is positioned between a fifth leg 103L5 and a sixth leg 103L6 each extending from the connector link 103A. As shown in FIG. 7, a fifth bore 425 extends through the third housing 102H1, the fifth leg 103L5 and the sixth leg 103L6. One of the self-lubricating sleeves 8 is secured in the fifth bore 425. A fifth shaft 435 extends into and rotatingly engages a radially inward facing surface of the self-lubricating sleeve 58.

Figure 10:
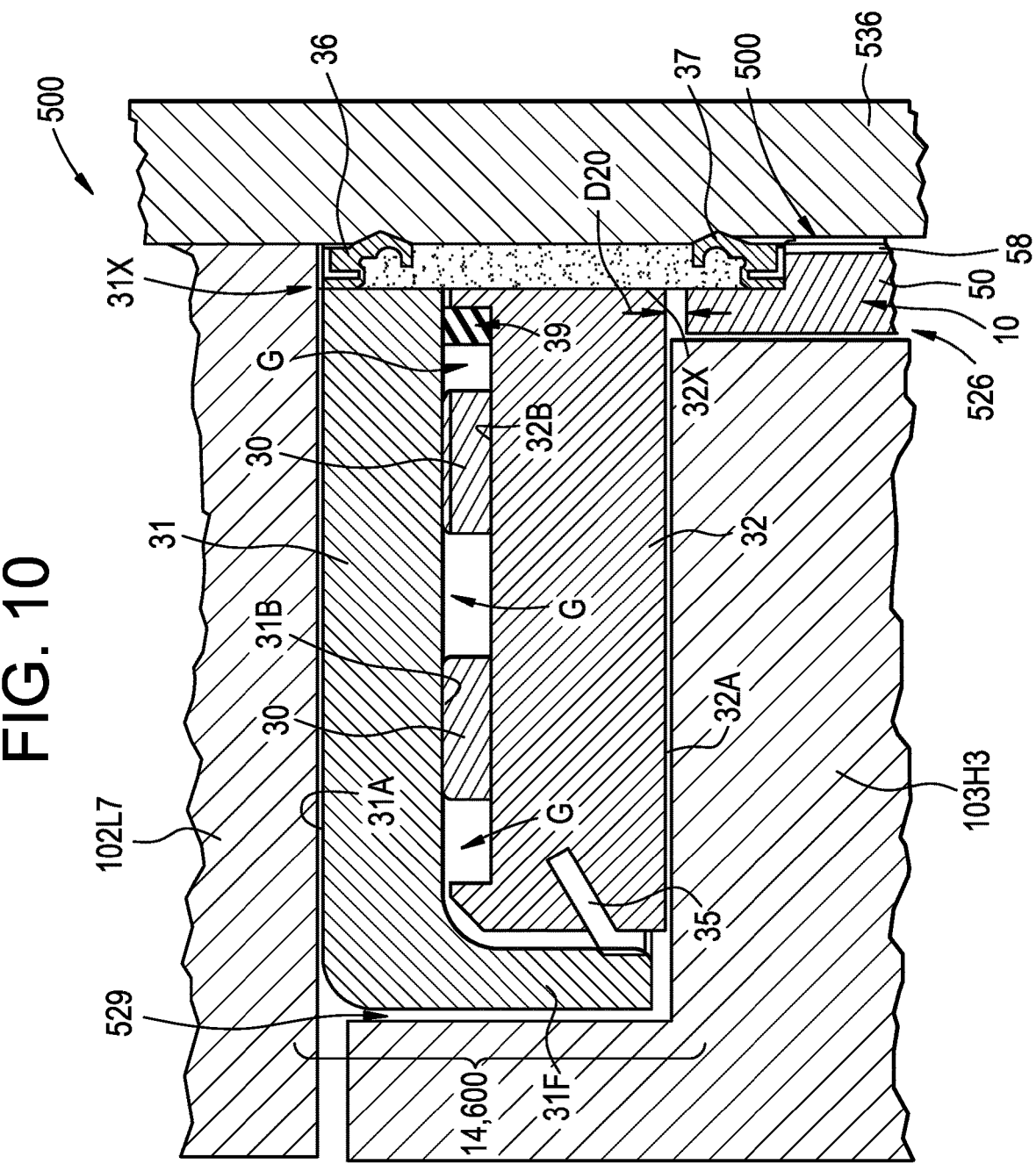
FIG. 10 is a cross sectional view of a first embodiment of a thrust bearing of the present invention.
Figure 11:
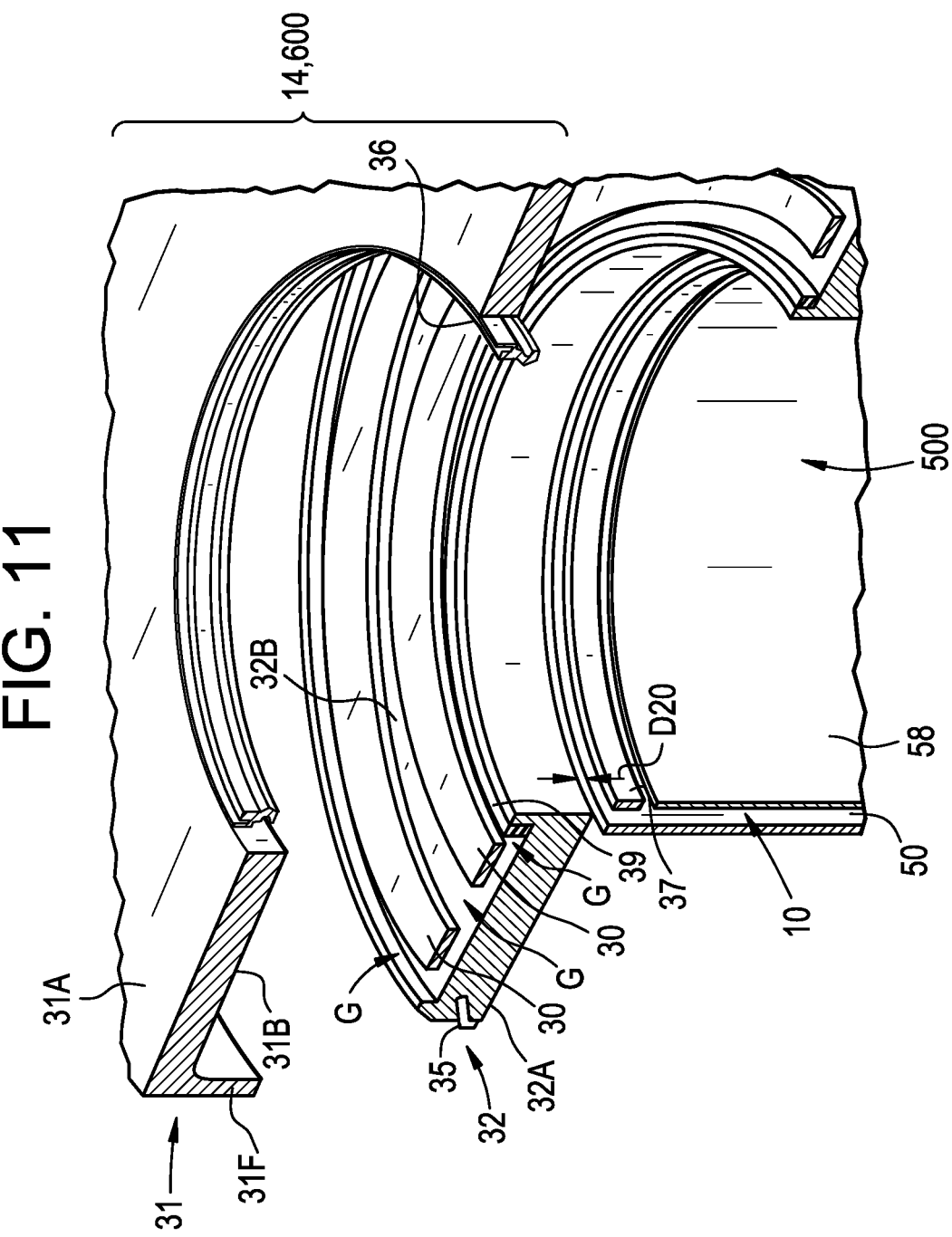
FIG. 11 an exploded perspective view of the thrust bearing of FIG. 10.
Figure 12:
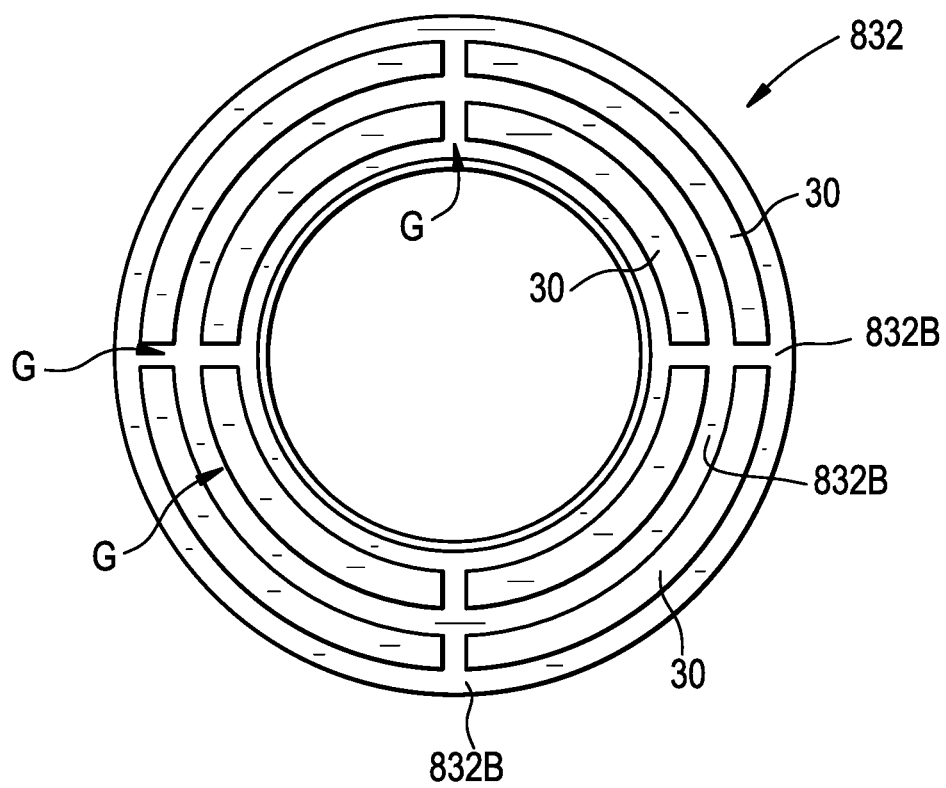
FIG. 12 is a top view of the thrust pad of the thrust bearing of FIG. 10.

As shown in FIG. 3, a fourth journal bearing assembly 500 (e.g., a vertical journal bearing assembly) is mounted in a fourth housing 103H3. The fourth housing 103H3 extends from the connector link 103A and is positioned between a seventh leg 102L7 and an eighth leg 102L8 each extending from the bowl support link 102A. As shown in FIG. 10, a sixth bore 526 extends through the fourth housing 103H3, the seventh leg 102L7 and the eighth leg 102L8. One of the self-lubricating sleeve assemblies 10 is secured in the fifth bore 435. A sixth shaft 536 extends into and rotatingly engages a radially inward facing surface of the self-lubricating sleeve 8. The fourth housing 103H3 has an annular recess 529 formed therein.

As shown in FIG. 10, a thrust bearing cartridge 14 is positioned in the annular recess 529, between the seventh leg 102L7 and the fourth housing 103H3. The thrust bearing cartridge 14 includes one or more self-lubricating pads 30 therein. The thrust bearing cartridge 14 is positioned above and spaced apart from the fourth journal bearing assembly 500 by a distance D20.

As shown in FIG. 10, the thrust bearing cartridge 14 includes a first thrust plate 31 having a first axially outwardly facing surface 31A and a first axially inwardly facing surface 31B. The thrust bearing cartridge 14 includes a second thrust plate 32 having a second axially outwardly facing 32A surface and a second axially inwardly facing surface 32B. The first axially inwardly facing surface 31B and the second axially inwardly facing surface 32B arranged to face one another. A self-lubricating pad 30 (e.g., liner or annular pads) is secured to the second axially inwardly facing surface 32B, wherein a portion of the self-lubricating liner slidingly engages the first axially inwardly facing surface 31B.

As shown in FIG. 10, the thrust bearing cartridge 14 includes an annular flange 31F extending from a first radially outer portion of the first thrust plate 31 and over a second outer portion of the second thrust plate 32. In one embodiment, a bearing seal 35 (e.g., an annular lip seal) extends between the annular flange 31F and the second thrust plate 32. The seal 35 is moveable with respect to the first thrust plate 31 and/or the second thrust plate 32. In one embodiment, another annular seal 39 extends between and sealingly engages radially inward portions of the first thrust plate 31 and/or the second thrust plate 32.

In one embodiment, the first axially facing surface 31B has a surface roughness of Ra 16 to Ra 8.

In one embodiment, the first thrust plate 31 has a first central opening 31X extending therethrough and the second thrust plate 32 has a second central opening 32X extending therethrough.

In one embodiment, an annular shaft seal 36 is disposed in the first central opening 31X and/or the second central opening 32X and engages the sixth shaft 536. In one embodiment, one annular shaft seal 36 (e.g., bearing seal) is disposed on radially inner portions of the first thrust plate 31 and/or the second thrust plate 32.

In one embodiment, the self-lubricating pad 30 has one or more grooves G (e.g., three grooves shown) formed therein for collection of debris.

Figure 13:
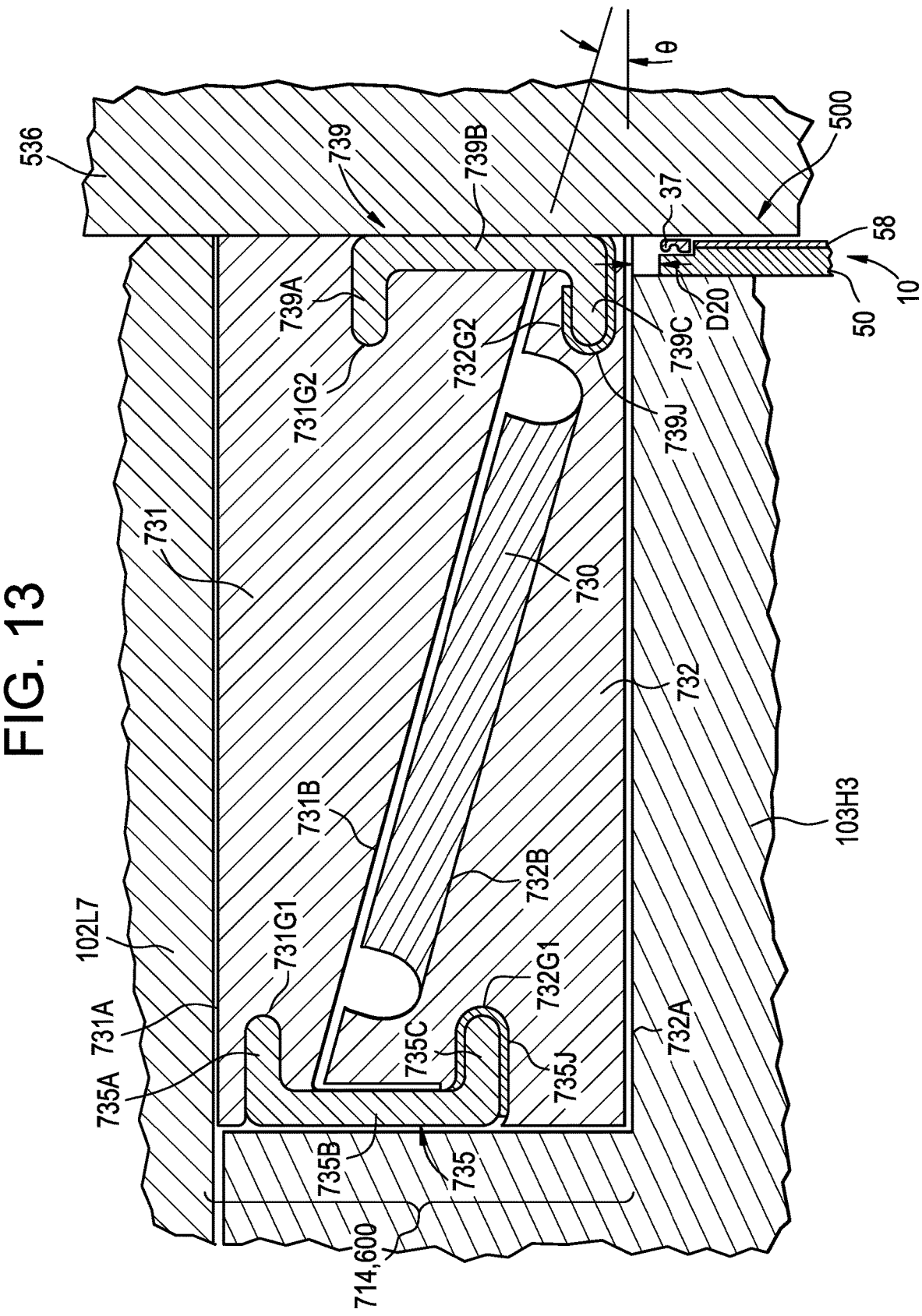
FIG. 13 is a cross sectional view of a second embodiment of a thrust bearing of the present invention.
Figure 14:
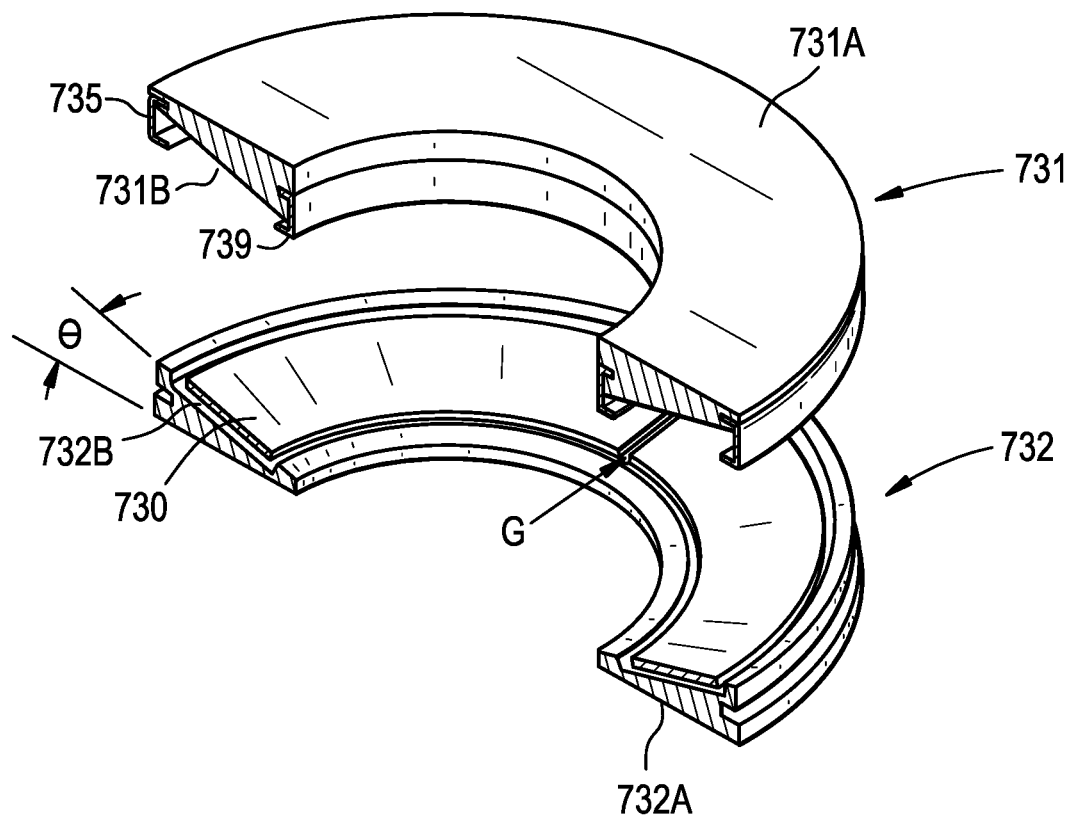
FIG. 14 is an exploded and cross sectional view of the thrust bearing of FIG. 13.

As shown in FIGS. 13 and 14, the thrust bearing cartridge 714 is similar to the thrust bearing cartridge 14 of FIG. 10. Thus, similar elements are assigned similar reference characters preceded by the numeral 7. The first thrust plate 731 has a decreasing taper (e.g., angle θ in a radially outward direction) and the second thrust plate 732 has in increasing taper in the radially outward direction. A self-lubricating liner 730 is disposed between the first thrust plate 731 and the second thrust plate 732, similar to that described above for the thrust bearing cartridge 14. The thrust bearing cartridge 714 has a C-shaped annular seal 735 extending between and slidingly engaging the first thrust plate 731 and the second thrust plate 732, on radially outward portions thereof. The thrust bearing cartridge 714 has a C-shaped annular seal 739 extending between and slidingly engaging the first thrust plate 731 and the second thrust plate 732, on a radially inward portion thereof.

As shown in FIG. 13, the C-shaped annular seal 735 includes a first leg 735A extending radially inward from one end of a base portion 735B and a second leg 735C extending radially inward from a second end of the base portion 735B.

In one embodiment, a J-shaped cup 735J is secured over the second leg 735C. The J-shaped cup is manufactured from a lubricious material such as a plastic. The J-shaped cup 735J is seated in and slidingly engages a second groove 732G1 formed in the second thrust plate 732. The first leg 735A is secured in a first groove 731G1 formed in the first thrust plate 731. While the J-shaped cup is shown and described as being secured over the second leg 735C, the present invention is not limited in this regard as one of the J-shaped cups may be secured to the first leg 735A in addition to or in the alternative to being secured to the second leg 735C.

As shown in FIG. 13, the C-shaped annular seal 739 includes a first leg 739A extending radially outward from one end of a base portion 739B and a second leg 739C extending radially outward from a second end of the base portion 739B. In one embodiment, a J-shaped cup 739J is secured over the second leg 739C. The J-shaped cup is manufactured from a lubricious material such as a plastic. The J-shaped cup 739J is seated in and slidingly engages a second groove 732G2 formed in the second thrust plate 732. The first leg 739A is secured in a first groove 731G2 formed in the first thrust plate 731. While the J-shaped cup is shown and described as being secured over the second leg 739C, the present invention is not limited in this regard as one of the J-shaped cups may be secured to the first leg 739A in addition to or in the alternative to being secured to the second leg 739C.

Figure 8:
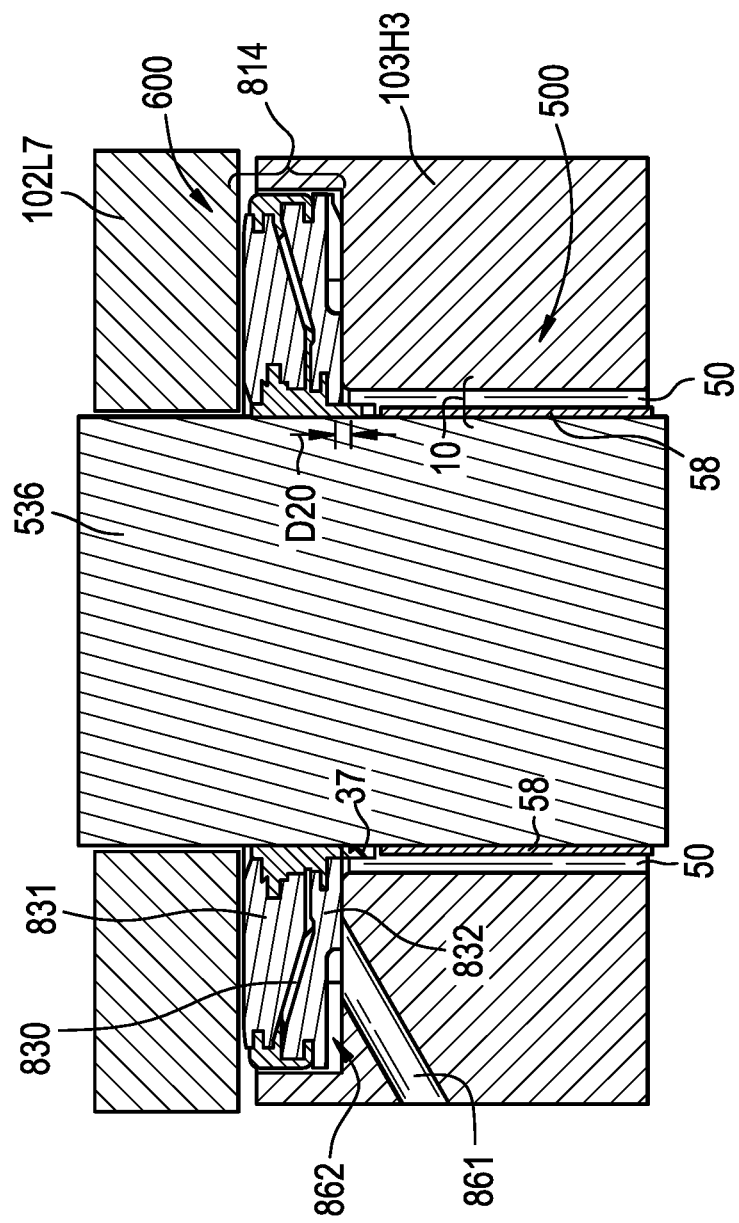
FIG. 8 is a cross sectional view of a thrust bearing of the present invention installed in a journal bearing assembly.
Figure 9:
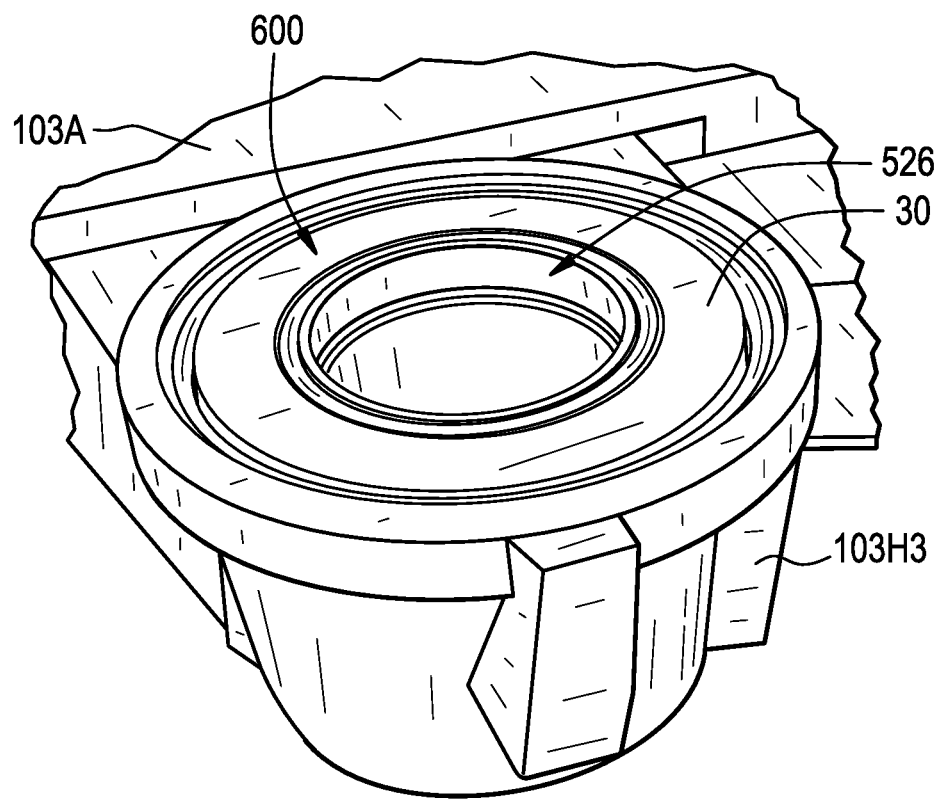
FIG. 9 is a perspective and enlarged view of a cup portion of the journal bearing assembly of FIG. 8 shown with the thrust bearing therein.
Figure 15:
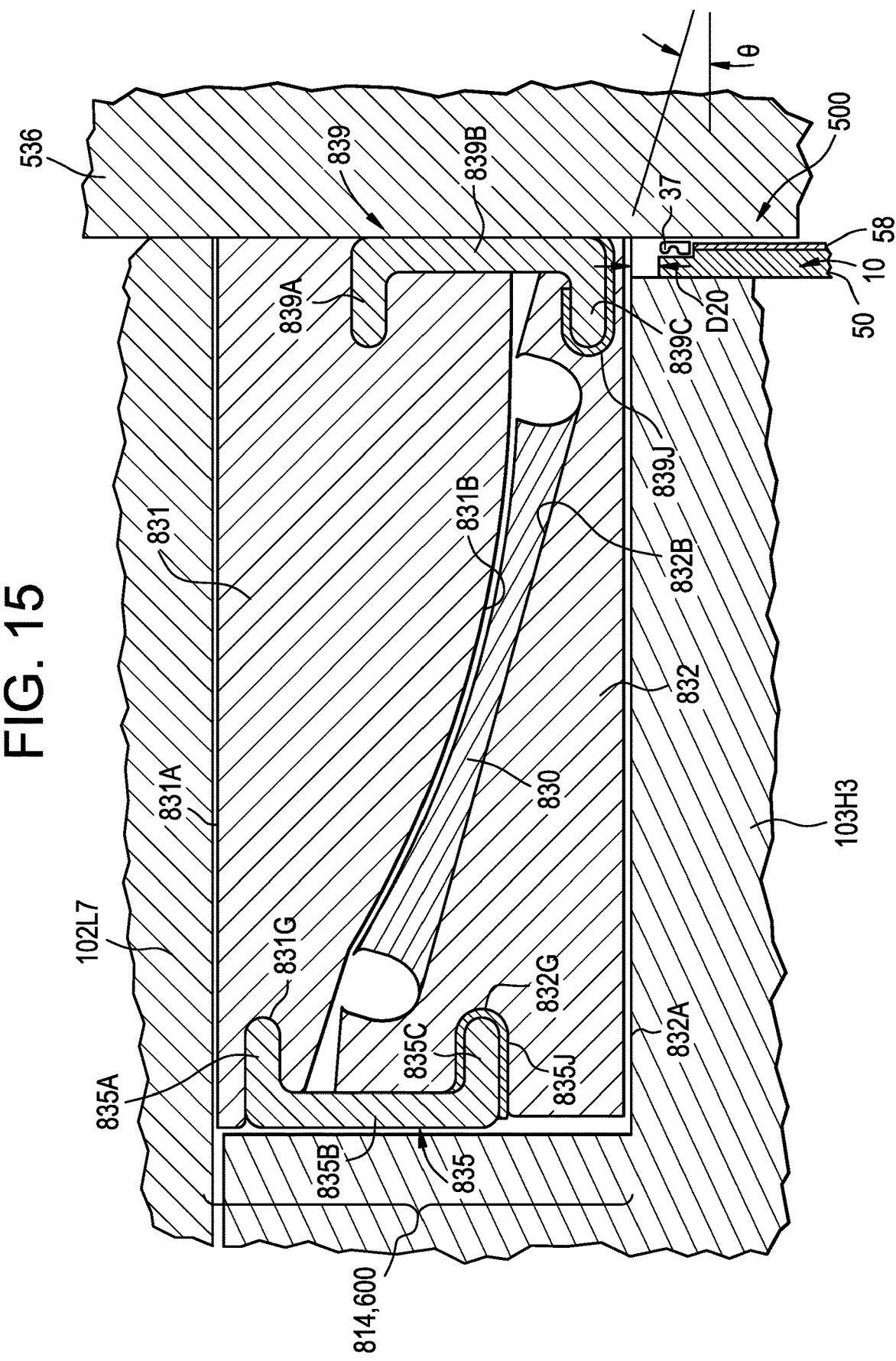
FIG. 15 is a cross sectional view of a third embodiment of a thrust bearing of the present invention.
Figure 16:
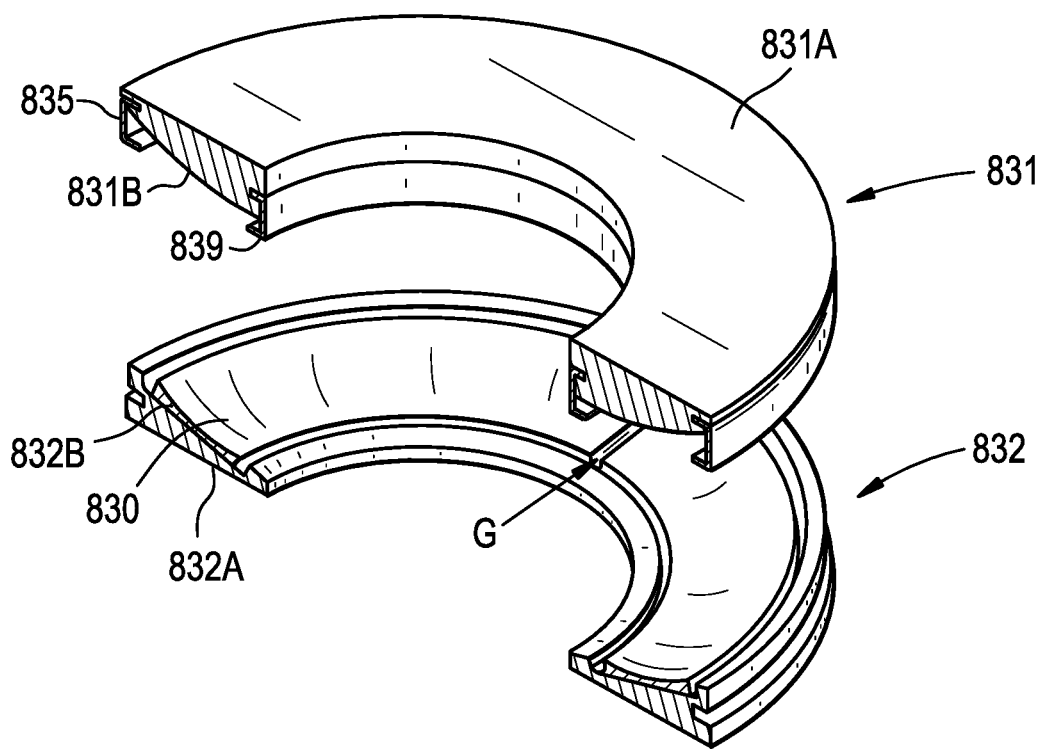
FIG. 16 is an exploded and cross sectional view of the thrust bearing of FIG. 15.

As shown in FIGS. 8, 15 and 16, the thrust bearing cartridge 814 is similar to the thrust bearing cartridge 714 of FIGS. 13 and 14. Thus, similar elements are assigned similar reference characters with the leading numeral 7 replaced with the numeral 8. The first inwardly facing surface 831B has an arcuate contour, for example a spherical contour.

Figure 17:
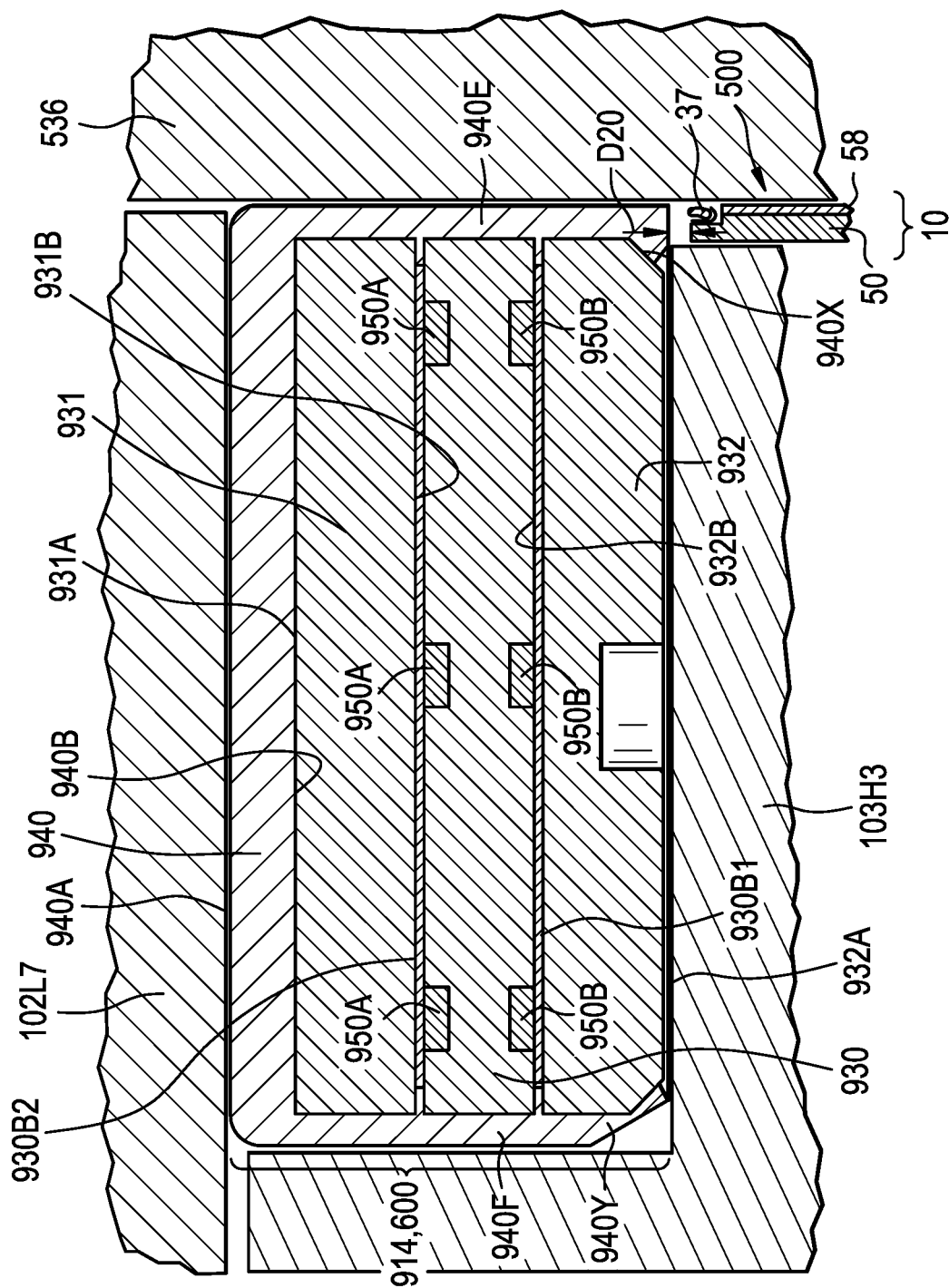
FIG. 17 is a cross sectional view of a fourth embodiment of a thrust bearing of the present invention.
Figure 18:
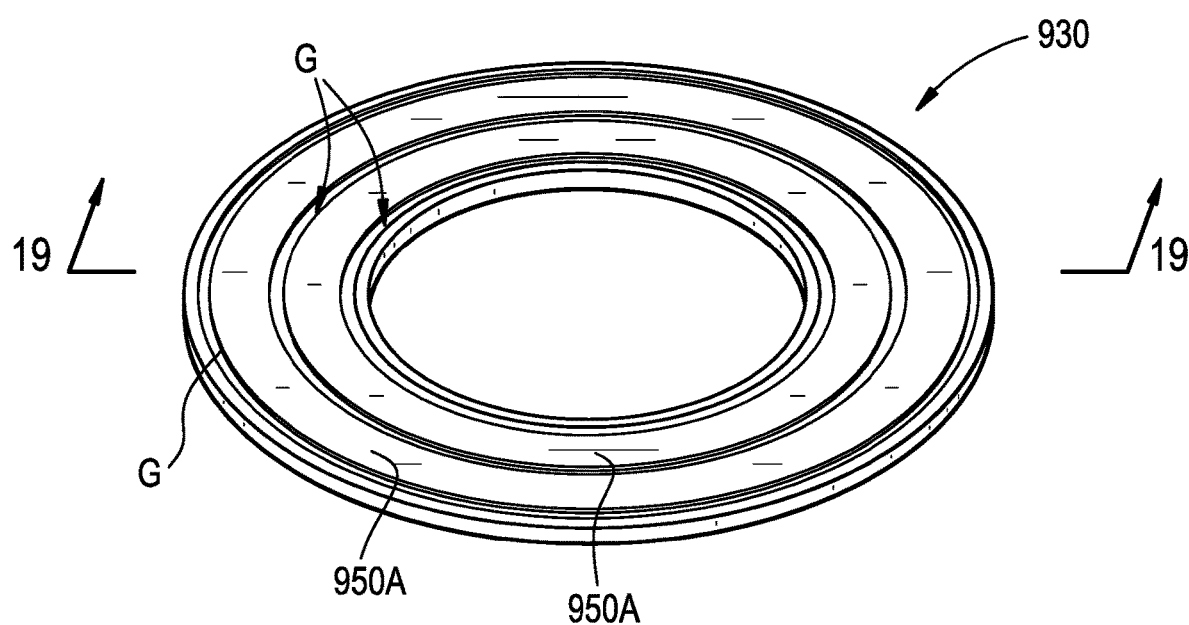
FIG. 18 is a top perspective view of the thrust plate of the thrust bearing of FIG. 17.
Figure 19:
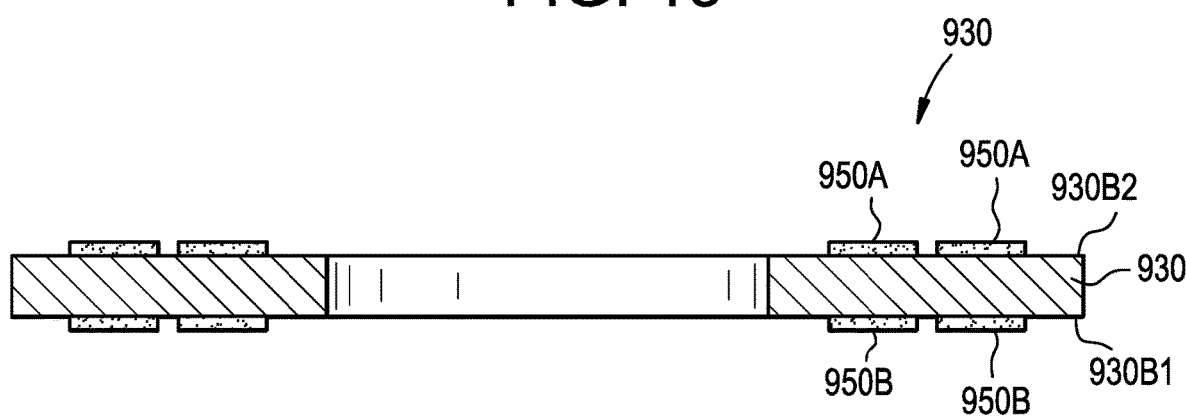
FIG. 19 is a cross sectional view of the thrust plate of FIG. 18 taken across line 19-19.

As shown in FIGS. 17, 18 and 19, the thrust bearing cartridge 914 is similar to the thrust bearing cartridge 14 of FIG. 10. Thus, similar elements are assigned similar reference characters preceded by the numeral 9. The thrust bearing cartridge 914 includes a first thrust plate 931 having a first axially outwardly facing surface 931A and a first axially inwardly facing surface 931B. The thrust bearing cartridge 914 includes a second thrust plate 932 having a second axially outwardly facing surface 931A and a second axially inwardly facing surface 932B. The first axially inwardly facing surface 931B and the second axially inwardly facing surface 932B arranged to face one another. The thrust bearing cartridge 914 includes a third thrust plate 930 having two third axially outward facing surfaces 930B1 and 930B2. The third thrust plate 930 is positioned between the first thrust plate 931 and the second thrust plate 932. A self-lubricating liner 950A is secured to the third axially outwardly facing surface 930B2 and a self-lubricating liner 950B is secured to the third axially outwardly facing surface 930B1. A portion of the self-lubricating liner 950B slidingly engages the first axially inwardly facing surface 931B and a portion of the self-lubricating liner 950A slidingly engages the second axially inward facing surface 932B. In one embodiment the thrust bearing cartridge 914 includes a C-shaped cover 940 that has a radially outward flange 940F and a radially inward flange 940E that extend axially over the first thrust plate 931, second thrust plate 932 and the third thrust plate 930. The C-shaped cover 940 covers the first axially outward surface 931A. The C-shaped cover 940 has a radially inward facing lip 940Y swaged over a radially outer portion of the second axially outward facing surface 932A. The C-shaped cover 940 has a radially outward facing lip 940X swaged over a radially inner portion of the second axially outward facing surface 932A.

Figure 21:
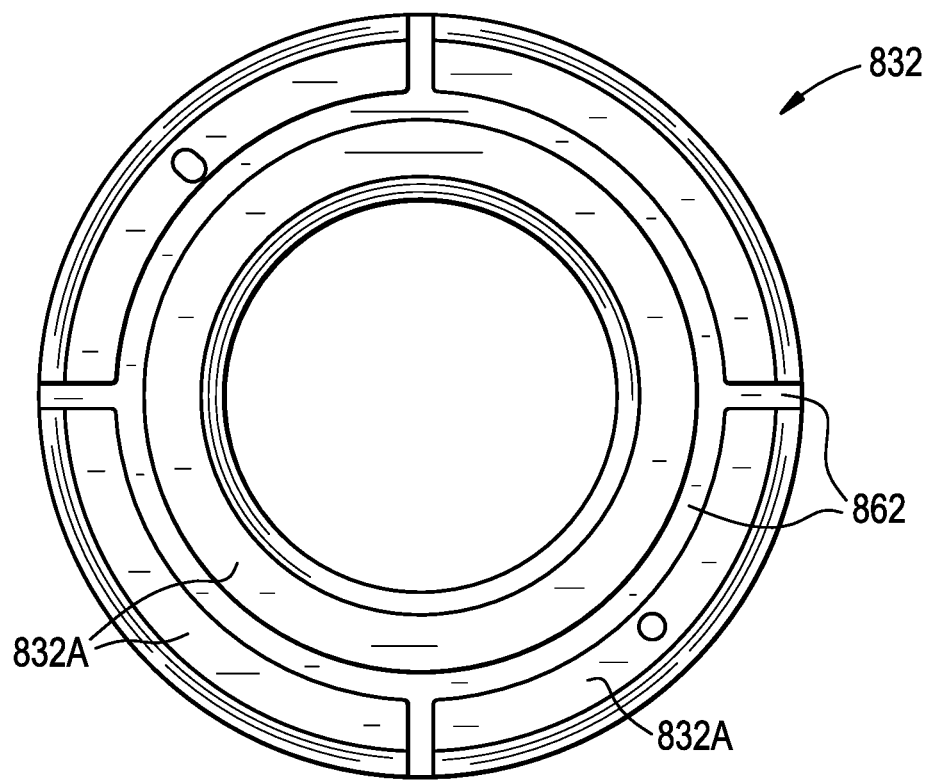
FIG. 21 is a bottom view of an embodiment of any of the thrust bearings of FIGS. 8, 10, 13, 15 and 17.

Referring to FIG. 21, in one embodiment the second thrust plate 32, 732, 832 and 932 has grooves 862 formed in the second axially outward facing surface 832A. The grooves 862 provide a flow path for liquids such as water to flow through and discharge through a channel 861 (see FIG. 8) formed in the fourth hub 103H2.

Figure 25:
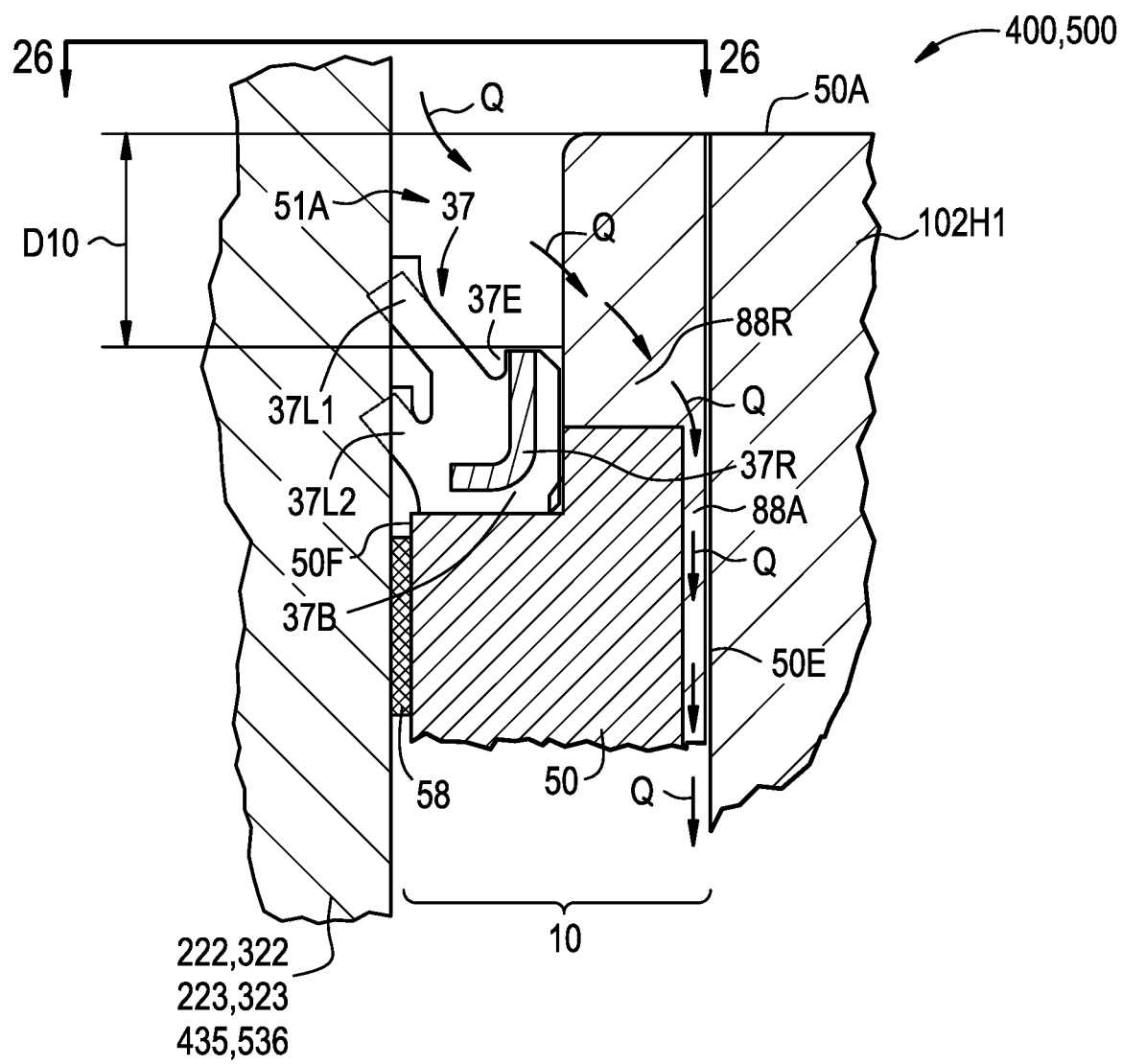
FIG. 25 is a cross sectional view another embodiment of the bearing and seal of FIG. 22 in which the bearing has radial and axial slots formed therein.
Figure 26:
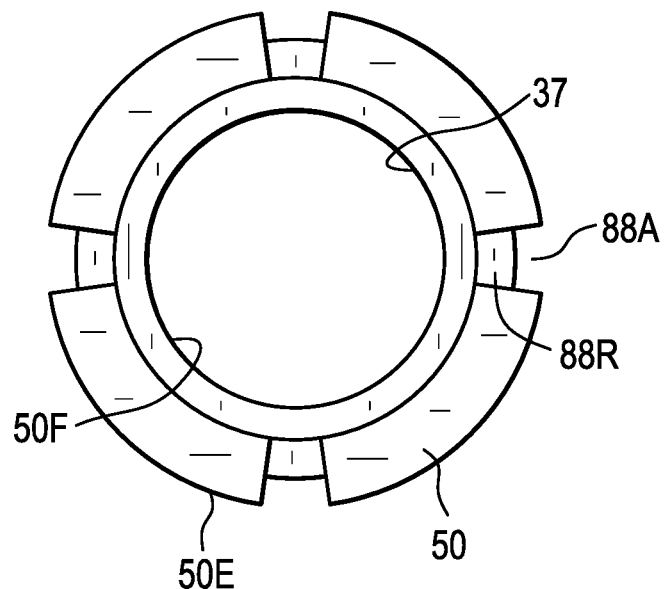
FIG. 26 is an end view of the bearing and seal of FIG. 25 taken from the viewpoint of line 26-26.

As shown in FIGS. 25 and 26, for the journal bearing assemblies 400 and 500 where the shaft 435, 536 axis is vertical, there are axial slots 88A extending axially along the exterior surface 50E of the outer sleeve 50. The axial slots 88A transition into a radial slot 88R at the first end 50A of the outer sleeve 50 The axial slots 88A have a depth sufficient to allow water to flow down and out of the outer sleeve 50 as indicated by the arrows Q, in order to prevent water collection above the annular seal 37. The radial slots 88R extend an axial distance D10 from the first end 50A (i.e., top end) to a plane aligned with a top edge 37E of the annular seal 37. The radial slots 88R extend radially through (i.e., entirely) the outer sleeve 50 along the axial length D10.

Figure 27:
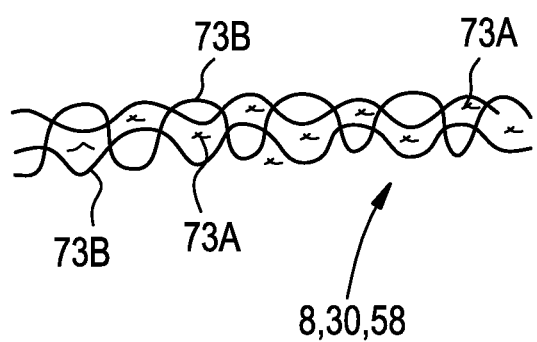
FIG. 27 is a schematic cross sectional view of a self-lubricating pad and sleeve of the present invention.

As shown in FIG. 27, the self-lubricating pads 8 and 30 and the self-lubricating sleeve 58 are manufactured from a self-lubricating material and liners, such as but not limited to polytetrafluoroethylene (PTFE) materials and liner systems with resins including, phenolic resins, polyimide resins and polyimide resins in conjunction with fiber weaves, fabrics or matrix materials, including but not limited to polyester, meta-aramids (e.g., NOMEX), PTFE and glass. In one embodiment, the self-lubricating material and liners are a homogeneous entity or are a molded nearly homogenous system without a weave, fabric or matrix and are manufactured from one or more acrylates, as described further herein with respect to FIG. 27. In one embodiment, the self-lubricating material and liners are ceramic materials and metals. In one embodiment, the self-lubricating material is disposed on a metal substrate as described herein such as the end cap 212, 312 of FIG. 6 and the outer sleeve 50 of FIG. 7. The self-lubricating material has properties and characteristics sufficient to withstand high loads with insignificant wear. The use of the self-lubricating material in the manufacture of the self-lubricating pads 8, 30 and the self-lubricating sleeve 58 allows lubricious properties of the self-lubricating material to be maintained without addition of a lubricating agent such as oil or grease.

In one embodiment, as shown, for example, in FIG. 10, the self-lubricating pad 8 and 30 and/or the self-lubricating sleeve 58 are manufactured from a self-lubricating woven fabric 73. The woven fabric 73 includes a plurality of fibers 73B interwoven with one another and polytetrafluoroethylene (PTFE) 73A interwoven therewith. The fibers 73B include, for example, a polyester material, a stainless steel material and/or glass material. The fibers 73B interwoven with the PTFE enhance bondability of the self-lubricating pad 8 and 30 and/or the self-lubricating sleeve 58 to a substrate. In one embodiment, the interface (e.g., the shaft 222, 223, 322, 323, 435, 536) opposing self-lubricating sleeve 58 the liner or opposing (e.g., axial end the shaft 222, 223, 322, 323, 435, 536 or the first axially inwardly facing surface 31B) the self-lubricating pads 8 and 30 is coated to enhance lubrication. This coating is chosen so as not to degrade the performance of the sliding bearing The coating is chosen to prevent corrosion of the surface mated with the self-lubricating liner system. In another embodiment the shafts can be made of a stainless steel such as CRES or CREN steels of sufficient hardness to prevent galling of the steel surface when rubbing against the self-lubricated liner material.

Figure 5:
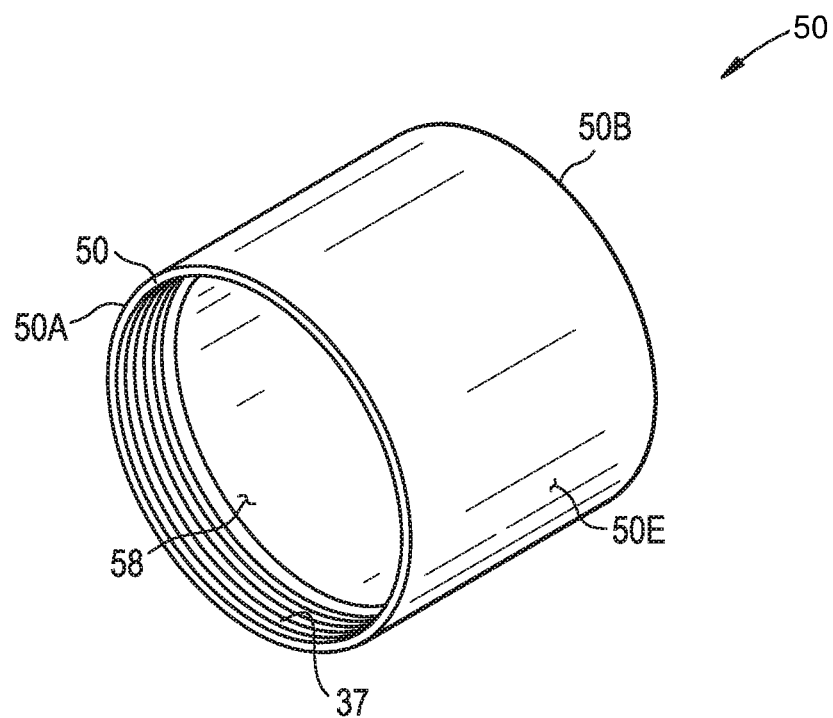
FIG. 5 is a perspective view of a journal bearing of the present invention.
Figure 6:
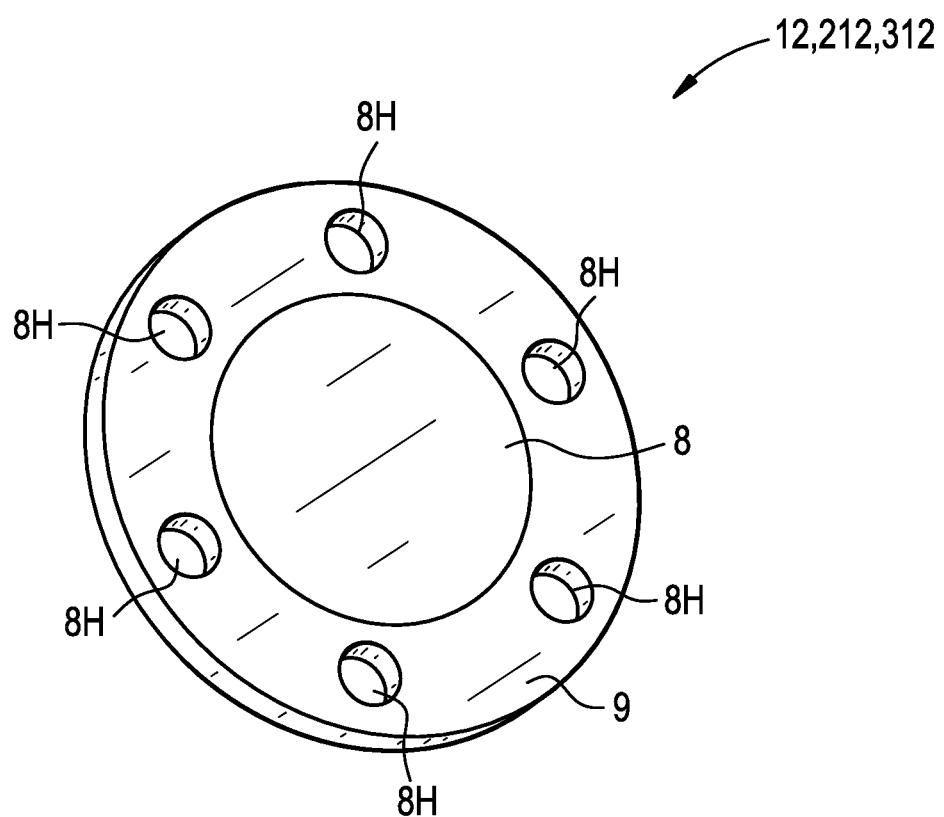
FIG. 6 is an inside perspective view of an end cap of the H-Link of FIG. 3.

As shown in FIGS. 3, 4, 5, 7, 8, 22, 23 and 25, the self-lubricating journal bearing assemblies 200, 300, includes four of the of the self-lubricating sleeve assemblies 10 therein and each of the self-lubricating journal bearing assemblies 400 and 500 includes one of the self-lubricating sleeve assemblies 10 therein. Each of the self-lubricating sleeve assemblies 10 includes an outer sleeve 50 (e.g., a metallic sleeve) extending from a first axial end 50A to a second axial end 50B thereof (FIGS. 5 & 7). As shown in FIG. 7, the outer sleeve 50 has an exterior surface 50E and an interior surface 50F. The interior surface 50F has a first recess 51A formed therein. The first recess 51A extends axially inward from the first axial end 50A and radially outward from the interior surface 50F. The interior surface 50F has a second recess 51B formed therein. The second recess 51B extends axially inward from the second axial end 50B and radially outward from the interior surface 50F. A self-lubricating sleeve 58 is secured (e.g., adhered to via an adhesive such as an epoxy or phenolic resin) to the interior surface 50F between the first recess 51A and the second recess 51B. In one embodiment, a first annular seal 37 is disposed in the first recess 51A and a second annular seal 37 disposed in the second recess 51B. In one embodiment, the self-lubricating sleeve 58 comprises PTFE as described further herein with respect to FIG. 27. It is contemplated that more than one first annular seal can be disposed in the first recess and more than one second annular seal can be disposed in the second recess.

Figure 20:
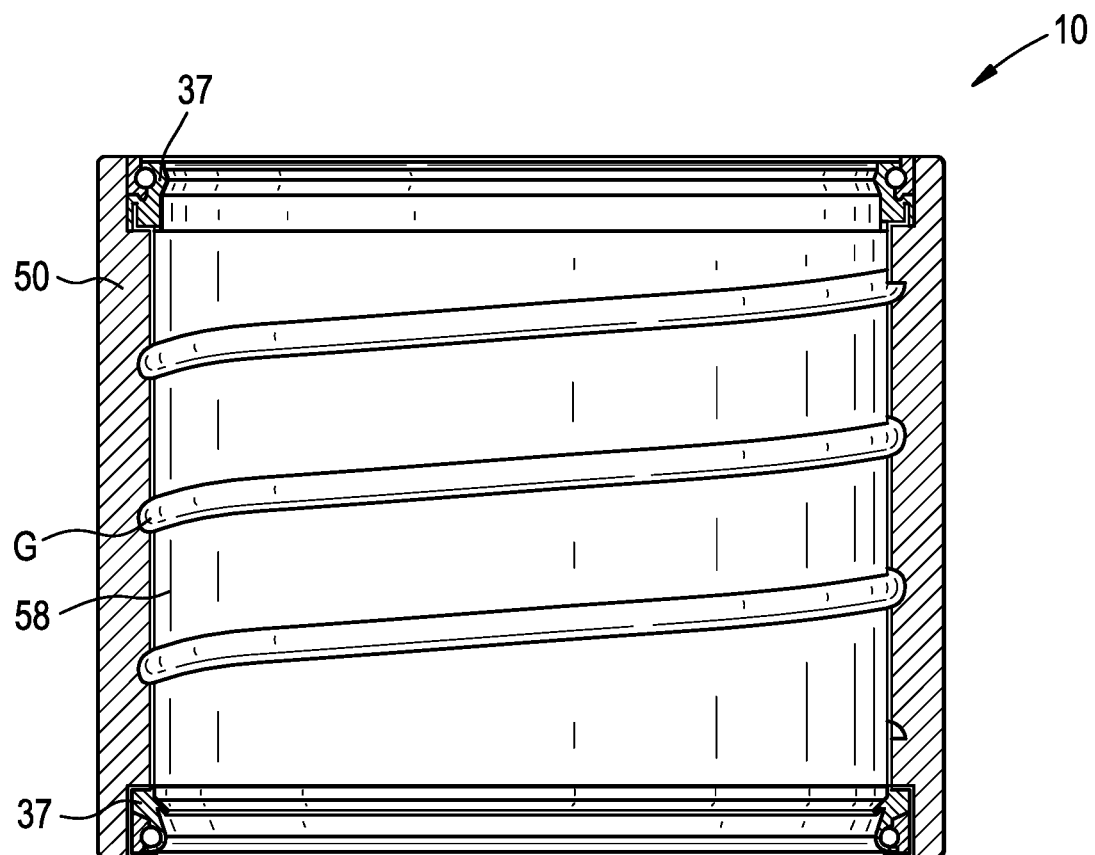
FIG. 20 is a cross sectional view of on an embodiment of a journal bearing with spiral grooves formed therein.

As shown in FIG. 3, the self-lubricating sleeve 58 comprises at least one groove G therein. As shown in FIG. 20, in one embodiment, the grooves G have a spiral configuration. In another embodiment, the grooves have a circumferential configuration. In one embodiment, the least one groove G extends into the outer sleeve 50.

Figure 22:
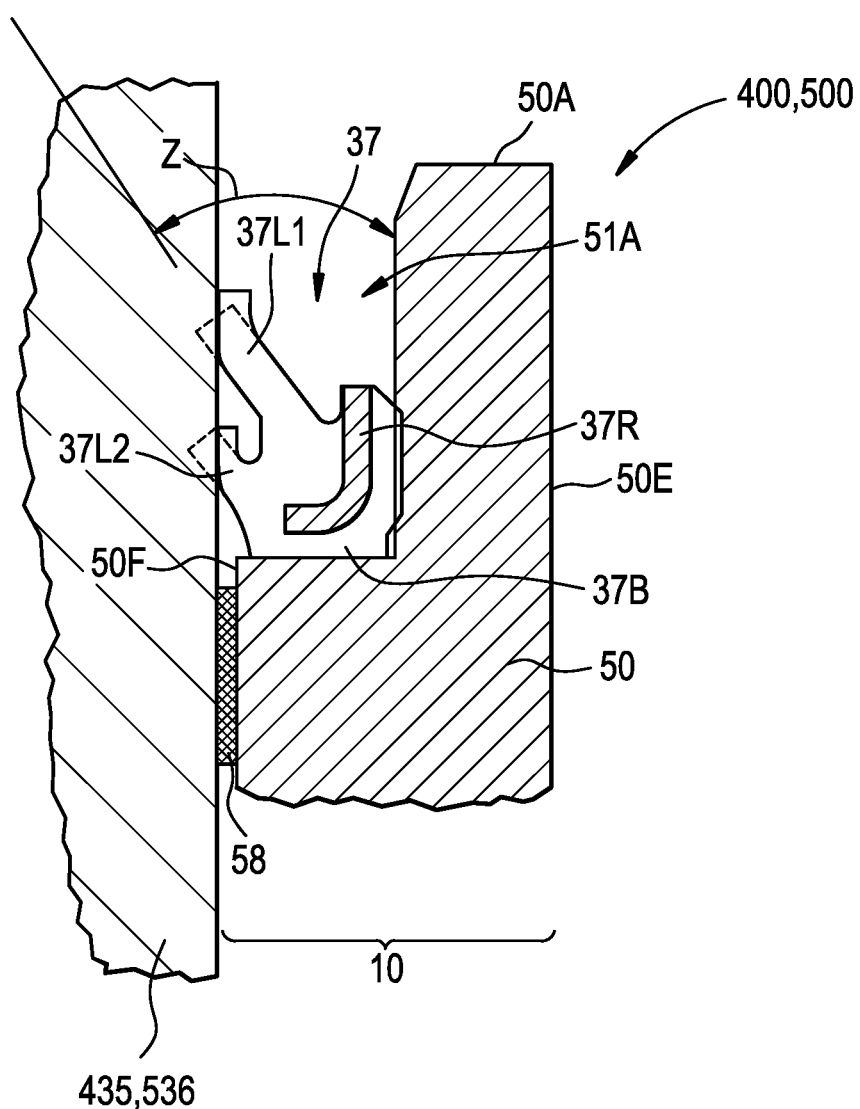
FIG. 22 is a cross sectional view of a portion of the journal bearing of FIGS. 5 and 7 illustrating one embodiment of a seal of the present invention.
Figure 23:
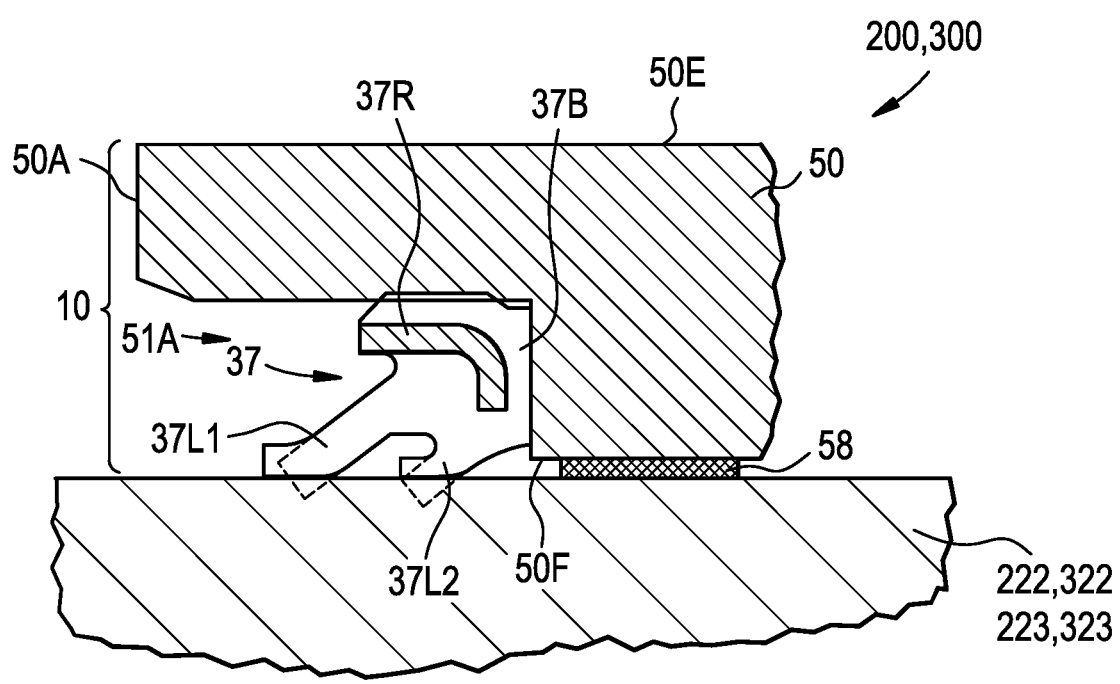
FIG. 23 is a cross sectional view of a portion of the journal bearing of FIG. 3 illustrating one embodiment of a seal of the present invention.

As shown in FIGS. 22 and 23, the annular seal 37 includes a base portion 37B with a first leg 37L1 and a second leg 37L2 extending outward therefrom at an angle Z relative to an interior surface of the recess 51A. In one embodiment, the annular seal 37 has an L-shaped metallic retainer 37R embedded in the base 37B. The base 37B of the annular seal 37 is biased radially outward to frictionally secure the annular seal 37 into the recess 51A. The first leg 37L1 and the second leg 37L2 are flexible and urged radially outward from a relaxed state (shown by dashed lines) by contact with the shaft 222, 223, 322, 323, 435, 536. In one embodiment, the second leg 37L2 is shorter that the first leg 37L1.

Figure 24:
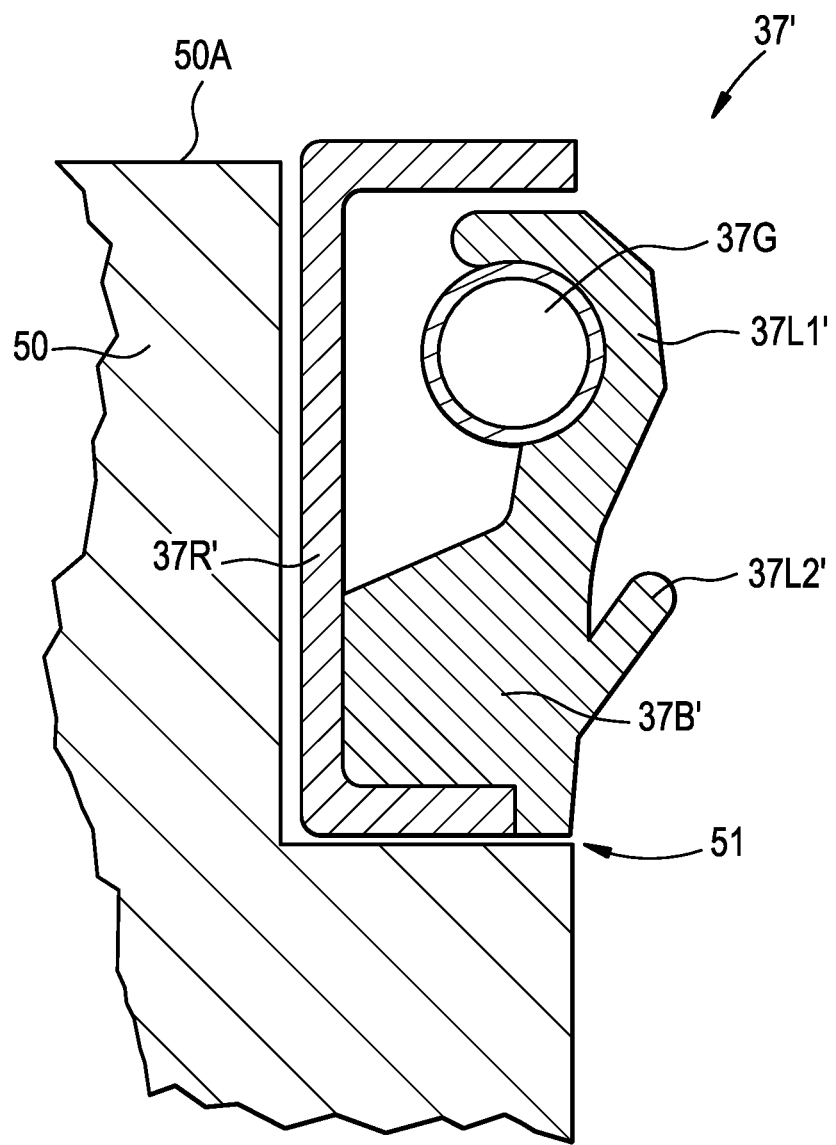
FIG. 24 is a cross sectional view of a portion of any of the journal bearings of FIGS. 3, 5 and 7 illustrating another embodiment of a seal of the present invention.

As shown in FIG. 24, the seal 37' includes a base portion 37B' with a first leg 37L1' and a second leg 37L2' extending outward therefrom. The annular seal 37' has a C-shaped metallic retainer 37R' secured to the base 37B and axially enveloping the annular seal 37'. The C-shaped retainer 37R' is press fit into the recess 51A to secure the annular seal 37' therein.

Although the invention is described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A self-lubricating journal bearing assembly comprising:
   a housing having an interior housing surface that defines a bore extending through the housing;
   a shaft extending into the bore, the shaft having an exterior shaft surface;
   an outer sleeve extending from a first axial end to a second axial end thereof, the outer sleeve having an exterior sleeve surface and an interior sleeve surface, the interior sleeve surface having a first recess formed therein, the first recess extending axially inward from the first axial end and radially outward from the interior sleeve surface, the interior sleeve surface having a second recess formed therein, the second recess extending axially inward from the second axial end and radially outward from the interior sleeve surface; and
   a self-lubricating sleeve being secured to the interior sleeve surface between the first recess and the second recess;
   at least one axial groove formed on the exterior sleeve surface of the outer sleeve and at least one radial groove extending radially through the outer sleeve, the at least one radial groove extending axially inward from the first axial end of the outer sleeve;
   a first annular seal secured in the first recess and a second annular seal secured in the second recess, each of the first annular seal and the second annular seal having at least one sealing leg that is in sealing contact with the shaft, such that the self-lubricating sleeve is sealed between the shaft, the outer sleeve, the first annular seal and the second annular seal; and
   the at least one axial groove and the at least one radial groove forming a flow path between the outer sleeve and the housing for prevention of fluid accumulation outside of the first annular seal and the second annular seal.

2. The self-lubricating journal bearing assembly of claim 1, wherein the self-lubricating sleeve comprises PTFE.

3. The self-lubricating journal bearing assembly of claim 1, wherein the self-lubricating sleeve comprises at least one groove therein.

4. The self-lubricating journal bearing assembly of claim 3, wherein the at least one groove of the self-lubricating sleeve of the self-lubricating sleeve has a spiral configuration.

5. The self-lubricating journal bearing assembly of claim 3, wherein the at least one groove of the self-lubricating sleeve of the self-lubricating sleeve has a circumferential configuration.

6. The self-lubricating journal bearing assembly of claim 3, wherein the at least one groove of the self-lubricating sleeve of the self-lubricating sleeve extends into the outer sleeve.

7. The self-lubricating journal bearing assembly of claim 1, wherein the outer sleeve comprises a metallic material.

8. The self-lubricating journal bearing assembly of claim 1, wherein each of the first annular seal and the second annular seal comprises a base portion and wherein the at least one sealing leg comprises a first leg and a second leg extending outwardly therefrom at an angle relative to the respective one of the first recess and the second recess.

9. The self-lubricating journal bearing assembly of claim 8, wherein the first annular seal and the second annular seal each have an L-shaped metallic retainer embedded in the base portion.

10. The self-lubricating journal bearing assembly of claim 8, wherein the base portion is biased radially outward to frictionally secure the at least one of the first annular seal into the first recess and the at least one of the second annular seal into the second recess.

11. A self-lubricating journal bearing assembly comprising:
    a housing having an interior housing surface that defines a bore extending through the housing;

a shaft extending into the bore, the shaft having an exterior shaft surface;

an outer sleeve extending from a first axial end to a second axial end thereof, the outer sleeve having an exterior sleeve surface and an interior sleeve surface, the interior sleeve surface having a first recess formed therein, the first recess extending axially inward from the first axial end and radially outward from the interior sleeve surface, the interior sleeve surface having a second recess formed therein, the second recess extending axially inward from the second axial end and radially outward from the interior sleeve surface;

a self-lubricating sleeve being secured to the interior sleeve surface between the first recess and the second recess;

a first annular seal secured in the first recess and a second annular seal secured in the second recess, each of the first annular seal and the second annular seal having at least one sealing leg that is in sealing contact with the shaft, such that the self-lubricating sleeve is sealed between the shaft, the outer sleeve, the first annular seal and the second annular seal; and at least one radially inward opening groove formed on self-lubricating sleeve thereby forming a space between the self-lubricating sleeve and the shaft.

12. The self-lubricating journal bearing assembly of claim 11, wherein the self-lubricating sleeve comprises PTFE.

13. The self-lubricating journal bearing assembly of claim 11, wherein the at least one groove has a spiral configuration.

14. The self-lubricating journal bearing assembly of claim 11, wherein the at least one groove has a circumferential configuration.

15. The self-lubricating journal bearing assembly of claim 11, wherein the at least one groove extends into the outer sleeve.

16. The self-lubricating journal bearing assembly of claim 11, wherein the outer sleeve comprises a metallic material.

17. The self-lubricating journal bearing assembly of claim 11, further comprising at least one axial groove formed on the exterior surface of the outer sleeve and at least one radial groove extending radially through the outer sleeve, the at least one radial groove extending axially inward from the first axial end of the outer sleeve.

18. The self-lubricating journal bearing assembly of claim 11, wherein each of the first annular seal and the second annular seal comprises a base portion and wherein the at least one sealing leg comprises a first leg and a second leg extending outwardly therefrom at an angle relative to the respective one of the first recess and the second recess.

19. The self-lubricating journal bearing assembly of claim 18, wherein the first annular seal and the second annular seal each have an L-shaped metallic retainer embedded in the base portion.

20. The self-lubricating journal bearing assembly of claim 18, wherein the base portion is biased radially outward to frictionally secure the at least one of the first annular seal into the first recess and the at least one of the second annular seal into the second recess.

21. The self-lubricating journal bearing assembly of claim 11, wherein the at least one groove is radially inwardly opening, thereby forming a space between the self-lubricating sleeve and the shaft.

* * * * *